United States Patent
Ikemoto

(10) Patent No.: US 9,578,587 B2
(45) Date of Patent: Feb. 21, 2017

(54) WIRELESS COMMUNICATION DEVICE AND ROUTE SELECTION METHOD IN WIRELESS NETWORK

(71) Applicant: FUJITSU LIMITED, Kawasaki-shi, Kanagawa (JP)

(72) Inventor: Kentaro Ikemoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 13/886,866

(22) Filed: May 3, 2013

(65) Prior Publication Data

US 2013/0242746 A1    Sep. 19, 2013

Related U.S. Application Data

(63) Continuation of application No. PCT/JP2010/071291, filed on Nov. 29, 2010.

(51) Int. Cl.
*H04L 12/28* (2006.01)
*H04L 12/413* (2006.01)
(Continued)

(52) U.S. Cl.
CPC ............. *H04W 40/02* (2013.01); *H04W 8/005* (2013.01); *H04W 40/12* (2013.01); *H04W 40/248* (2013.01); *H04W 84/18* (2013.01)

(58) Field of Classification Search
CPC ...... H04W 40/02; H04W 84/18; H04W 8/005; H04W 40/12; H04W 40/248; H04L 61/1523; H04L 12/28; H04L 12/56; H04L 45/124; H04L 47/623
(Continued)

(56) References Cited

U.S. PATENT DOCUMENTS

| 7,395,351 B1 * | 7/2008 | Nucci et al. ................ 709/242 |
| 2002/0036987 A1 * | 3/2002 | Garcia-Luna-Aceves et al. ......................... 370/238 |

(Continued)

FOREIGN PATENT DOCUMENTS

| JP | 2005-252563 | 9/2005 |
| JP | 2005-252563 A | 9/2005 |

(Continued)

OTHER PUBLICATIONS

Notification of Transmittal of Translation of the International Preliminary Report on Patentability (Form PCT/IB/338, Form PCT/IB/373 & Form PCT/ISA/237), PCT/JP2010/071291, 10 pages, dated Jun. 13, 2013.

(Continued)

*Primary Examiner* — Edan Orgad
*Assistant Examiner* — Vanneilian Lalchinthang
(74) *Attorney, Agent, or Firm* — Fujitsu Patent Center

(57) ABSTRACT

A wireless communication device used in a wireless network includes: a storage configured to store information that identifies an adjacent wireless communication device; an obtaining unit configured to obtain, from a first wireless communication device among the adjacent wireless communication devices, information that identifies a second wireless communication device that is adjacent to the first wireless communication device; a selector configured to select an adjacent wireless communication device in accordance with a destination of data; and a transmitter configured to transmit the data to the adjacent wireless communication device selected by the selector. The selector decreases a priority of the first wireless communication device in selecting the adjacent wireless communication device when the information that identifies the second wireless communication device is not stored in the storage.

3 Claims, 22 Drawing Sheets

(51) Int. Cl.
*H04L 12/26* (2006.01)
*H04W 40/02* (2009.01)
*H04W 8/00* (2009.01)
H04W 84/18 (2009.01)
H04W 40/12 (2009.01)
H04W 40/24 (2009.01)

(58) Field of Classification Search
USPC .......................................................... 370/238
See application file for complete search history.

(56) References Cited

U.S. PATENT DOCUMENTS

| | | | |
|---|---|---|---|
| 2003/0231599 A1* | 12/2003 | Umezawa | H04L 45/122 370/238 |
| 2005/0237973 A1* | 10/2005 | Takeda et al. | 370/329 |
| 2007/0242621 A1* | 10/2007 | Nandagopalan | H04L 12/413 370/254 |
| 2007/0245034 A1* | 10/2007 | Retana et al. | 709/238 |
| 2009/0175170 A1* | 7/2009 | Langguth | H04W 74/0808 370/236 |
| 2011/0038274 A1 | 2/2011 | Ikemoto et al. | |
| 2011/0075578 A1* | 3/2011 | Kim | H04L 45/124 370/252 |
| 2011/0292897 A1* | 12/2011 | Wu | H04W 72/0486 370/329 |

FOREIGN PATENT DOCUMENTS

| | | |
|---|---|---|
| JP | 2008-187237 | 8/2008 |
| JP | 2008-187237 A | 8/2008 |
| JP | 2009-267532 | 11/2009 |

OTHER PUBLICATIONS

Japanese Office Action mailed Oct. 29, 2013 for corresponding Japanese Application No. 2012-546594, with Partial English-language Translation.

International Search Report, mailed in connection with PCT/JP2010/071291 and mailed Feb. 15, 2011.

* cited by examiner

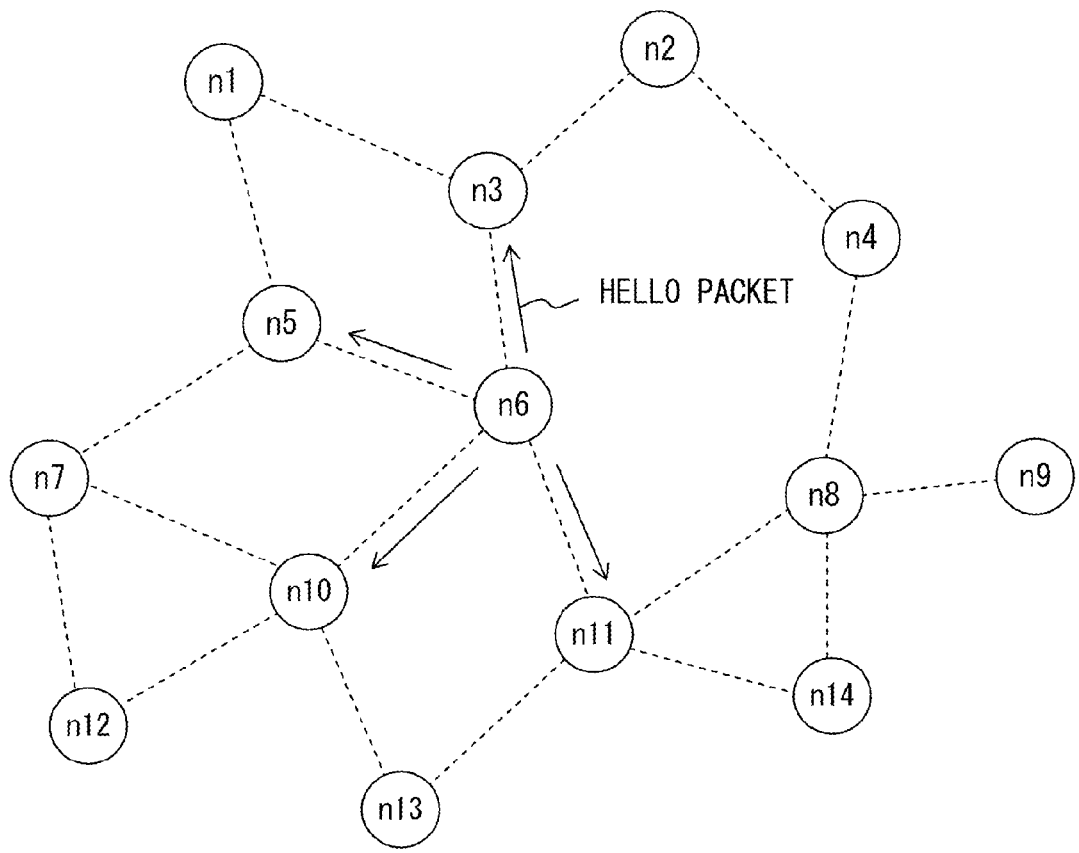
F I G. 2

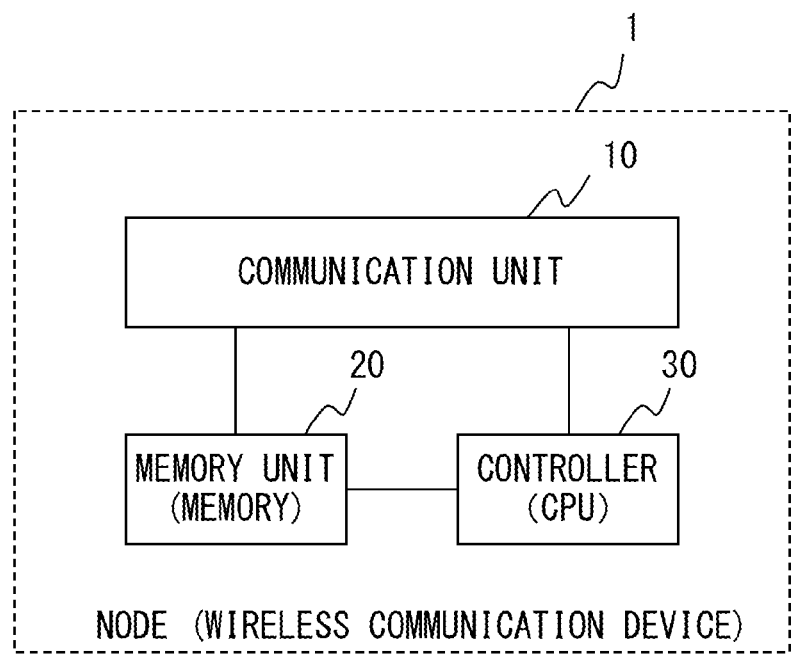
F I G. 3

| ADJACENT NODE | OUTGOING-LINK EVALUATION VALUE | INCOMING-LINK EVALUATION VALUE | LINK WEIGHT |
|---|---|---|---|
| Z | 11 | 9 | 10 |
| X | 9 | 9 | 9 |
| Y | 6 | 6 | 6 |

FIG. 6

| DESTINATION NODE | ADJACENT NODE | ROUTE WEIGHT | LINK WEIGHT | HIDDEN-TERMINAL WEIGHT | EVALUATION VALUE |
|---|---|---|---|---|---|
| G | G | | 6 | | 6 |
| Z | G | 10 | (6) | 10 | 26 |
| ... | | | | | |

| AD-HOC HEADER | DESTINATION NODE | ADJACENT NODE | OUTGOING-LINK EVALUATION VALUE | HIDDEN-TERMINAL INFORMATION | EVALUATION VALUE |

| SOURCE NODE : G | | |
|---|---|---|
| ID | CYCLE | RECEPTION TIME |
| 4 | 0:02 | 0:05 |
| 3 | 0:02 | 0:03 |
| 2 | 0:01 | 0:01 |
| 1 | 0:00 | 0:00 |

~ 23G

| SOURCE NODE : X | | |
|---|---|---|
| ID | CYCLE | RECEPTION TIME |
| 4 | 0:05 | 0:09 |
| 3 | 0:03 | 0:04 |
| 2 | 0:01 | 0:01 |
| 1 | 0:00 | 0:00 |

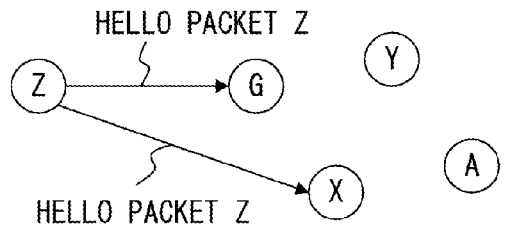

FIG. 12B
HELLO PACKET Z

| DESTINA-TION | ADJACENT | LINK | HIDDEN TERMINAL | EVALUATION |
|---|---|---|---|---|
| G | G | 9 | | 10 |
| X | X | 100 | | 100 |

FIG. 12C

LINK TABLE OF NODE G

| ADJA-CENT | OUTGOING | INCOMING | LINK WEIGHT |
|---|---|---|---|
| Z | 11 | 9 | 10 |
| ⋮ | | | |

LINK TABLE OF NODE X

| ADJA-CENT | OUTGOING | INCOMING | LINK WEIGHT |
|---|---|---|---|
| Z | 100 | 100 | 100 |
| ⋮ | | | |

FIG. 12D

ROUTING TABLE OF NODE G

| DES-TINA-TION | ADJA-CENT | ROUTE | LINK | HID-DEN TER-MINAL | EVALU-ATION VALUE |
|---|---|---|---|---|---|
| Z | Z | | 10 | | 10 |
| ⋮ | | | | | |

ROUTING TABLE OF NODE X

| DES-TINA-TION | ADJA-CENT | ROUTE | LINK | HID-DEN TER-MINAL | EVALU-ATION VALUE |
|---|---|---|---|---|---|
| ⋮ | | | | | |

F I G. 1 3 A

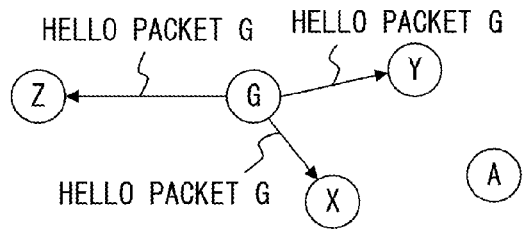

F I G. 1 3 B

HELLO PACKET G

| DESTINA-TION | ADJACENT | LINK | HIDDEN TERMINAL | EVALUATION |
|---|---|---|---|---|
| X | X | 9 | | 9 |
| Y | Y | 6 | | 6 |
| Z | Z | 9 | | 10 |

F I G. 1 3 C

LINK TABLE OF NODE Y

| ADJACENT | OUTGOING | INCOMING | LINK WEIGHT |
|---|---|---|---|
| G | 6 | 6 | 6 |
| ⋮ | | | |

LINK TABLE OF NODE X

| ADJACENT | OUTGOING | INCOMING | LINK WEIGHT |
|---|---|---|---|
| G | 9 | 9 | 9 |
| Z | 100 | 100 | 100 |
| ⋮ | | | |

F I G. 1 3 D

ROUTING TABLE OF NODE Y

| DESTINATION | ADJACENT | ROUTE | LINK | HIDDEN TERMINAL | EVALUATION VALUE |
|---|---|---|---|---|---|
| G | G | | 6 | | 6 |
| Z | G | 10 | (6) | 10 | 26 |
| ⋮ | | | | | |

ROUTING TABLE OF NODE X

| DESTINATION | ADJACENT | ROUTE | LINK | HIDDEN TERMINAL | EVALUATION VALUE |
|---|---|---|---|---|---|
| G | G | | 9 | | 9 |
| Z | G | 10 | (9) | | 19 |
| ⋮ | | | | | |

HELLO PACKET X

| DES-TINA-TION | ADJA-CENT | LINK | HIDDEN TER-MINAL | EVALU-ATION |
|---|---|---|---|---|
| G | G | 9 | | 9 |
| Z | G | 9 | | 19 |
| A | A | 5 | | 5 |

HELLO PACKET Y

| DES-TINA-TION | ADJA-CENT | LINK | HIDDEN TER-MINAL | EVALU-ATION |
|---|---|---|---|---|
| G | G | 6 | | 6 |
| Z | G | 6 | 10 | 26 |
| A | A | 6 | | 5 |

LINK TABLE OF NODE A

| ADJACENT | OUTGOING | INCOMING | LINK WEIGHT |
|---|---|---|---|
| X | 5 | 5 | 5 |
| Y | 4 | 6 | 5 |
| ⋮ | | | |

ROUTING TABLE OF NODE A

| DESTINA-TION | ADJACENT | ROUTE | LINK | HIDDEN TERMINAL | EVALUATION VALUE |
|---|---|---|---|---|---|
| Z | X | 19 | (5) | 10 | 34 |
| Z | Y | 26 | (5) | 20 | 41 |
| ⋮ | | | | | |

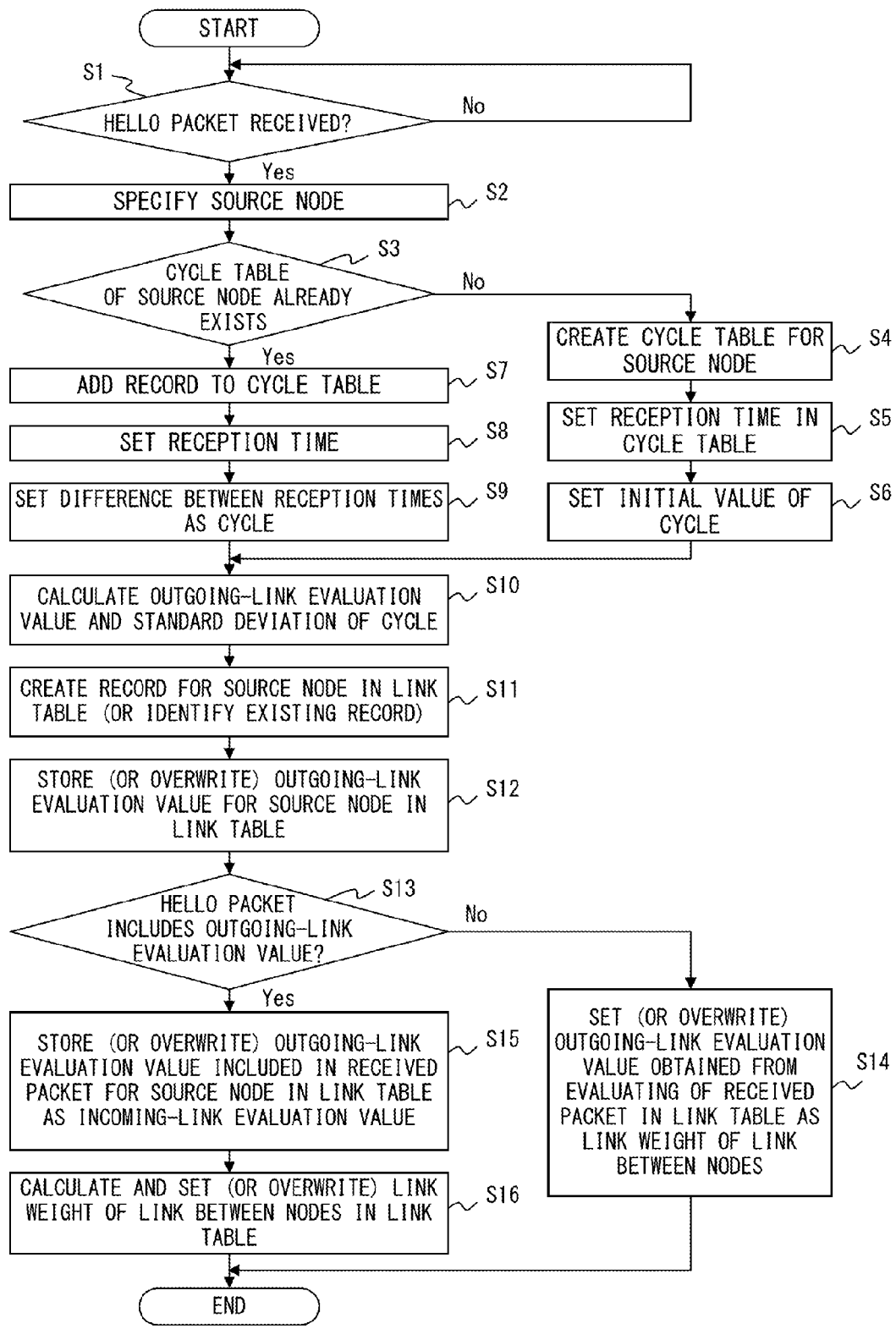
F I G. 1 5

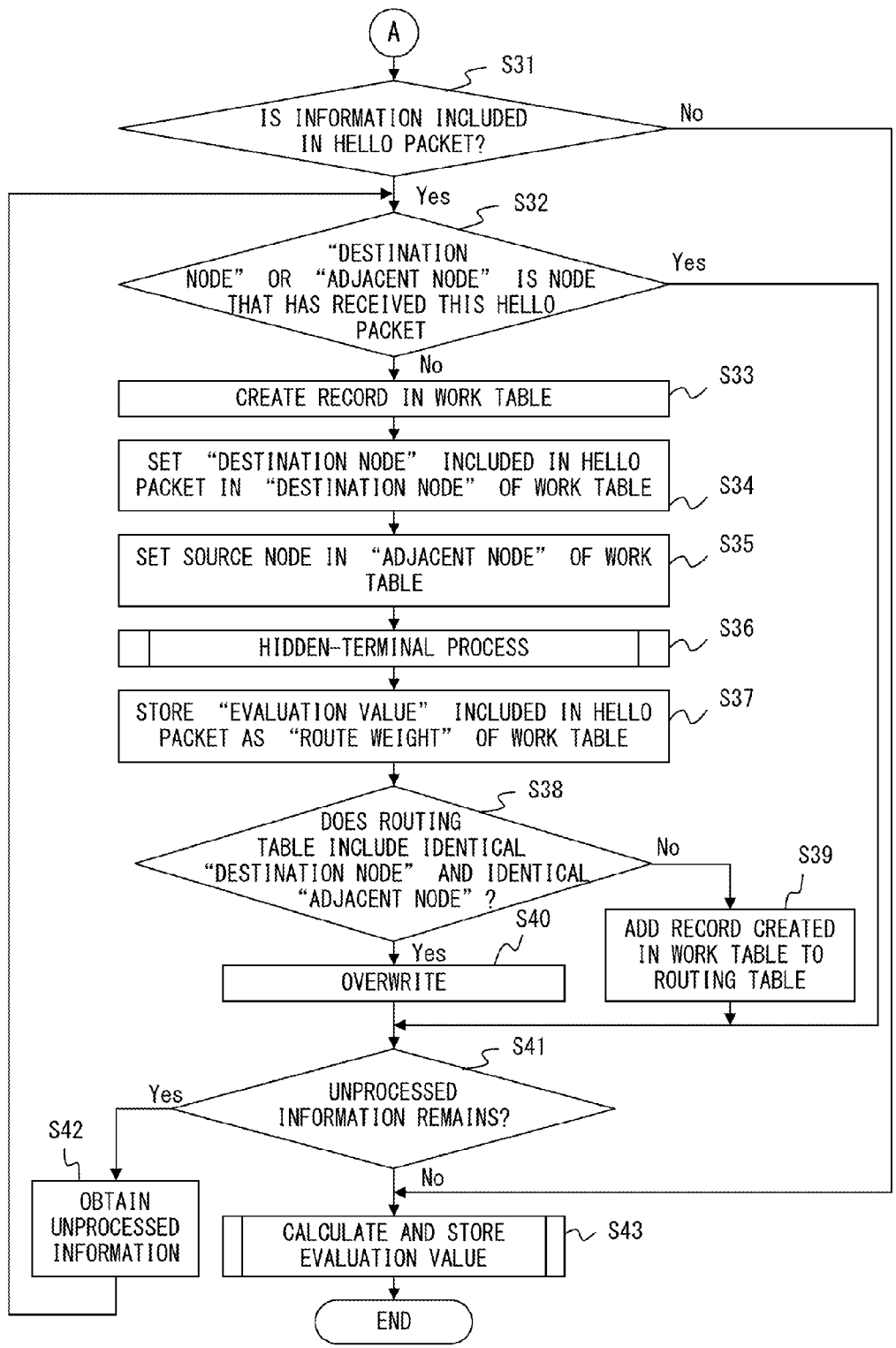
F I G. 17

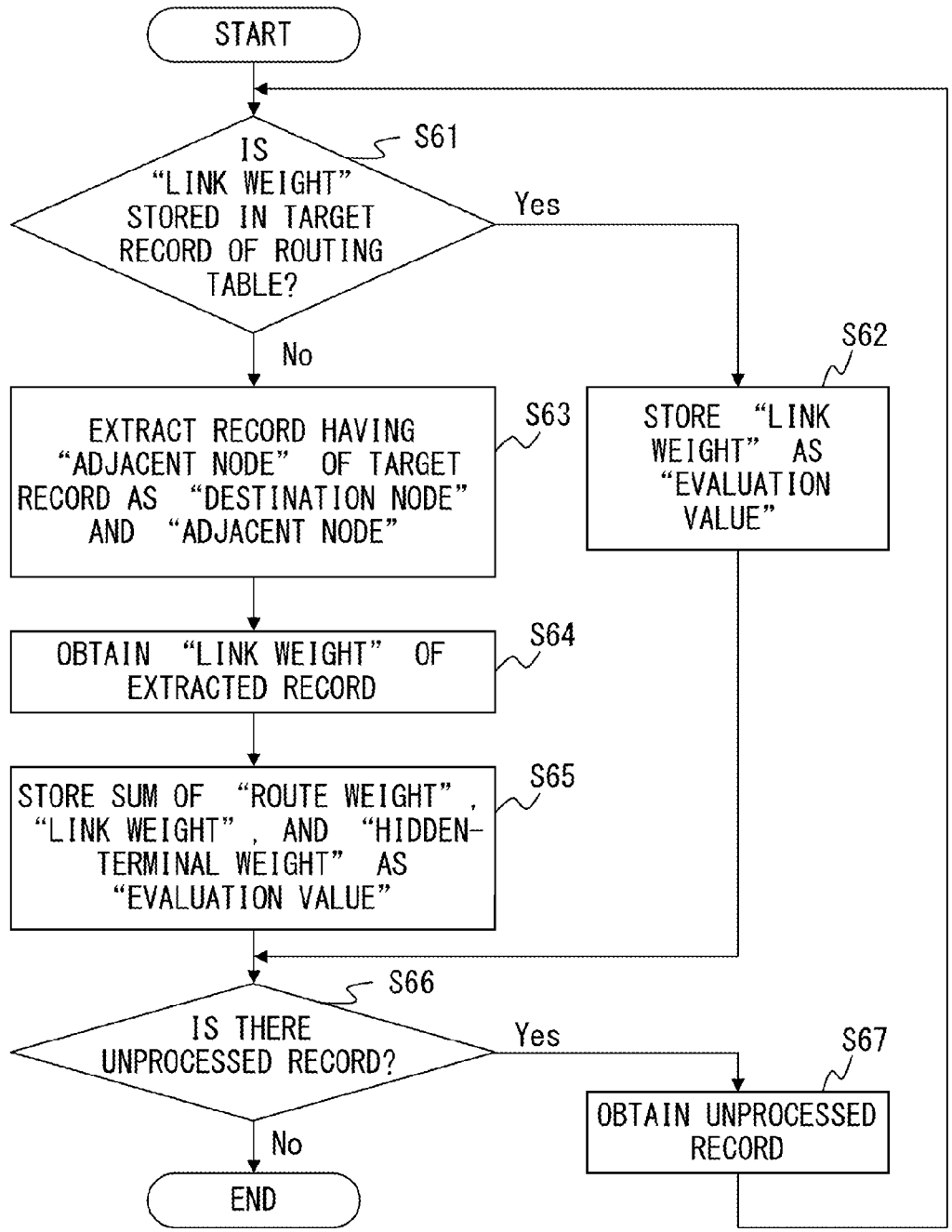
F I G. 19

| DES-TINATION | ADJACENT | ROUTE | LINK | EVALUATION VALUE | HIDDEN-TERMINAL FLAG | RANK |
|---|---|---|---|---|---|---|
| GW | n1 | 20 | (5) | 25 | ON | 3 |
| GW | n2 | 30 | (8) | 38 | OFF | 1 |
| GW | n3 | 35 | (5) | 40 | ON | 4 |
| GW | n4 | 40 | (6) | 46 | OFF | 2 |
| ⋮ | | | | | | |

FIG. 21

WIRELESS COMMUNICATION DEVICE AND ROUTE SELECTION METHOD IN WIRELESS NETWORK

CROSS-REFERENCE TO RELATED APPLICATION

This application is a continuation application of International Application PCT/JP2010/071291 filed on Nov. 29, 2010 and designated the U.S., the entire contents of which are incorporated herein by reference.

FIELD

The embodiments discussed herein are related to a wireless communication device used in a wireless network and a route selection method in the wireless network.

BACKGROUND

In recent years, research on ad-hoc networks in which wireless terminals are autonomously connected to each other has been developed. In an ad-hoc network, an access point is not provided, and each wireless terminal has routing information. Each wireless terminal forwards a packet received from an adjacent terminal to another adjacent terminal according to the routing information. Such a configuration allows a packet to be transmitted to a desired destination within the ad-hoc network.

In the ad-hoc network, a network environment frequently changes with, for example, a change in a radio field intensity or moving of a wireless terminal. Accordingly, each wireless terminal connected to the ad-hoc network performs routing control before the wireless terminal communicates with another wireless terminal. As an example, a wireless terminal newly connected to the ad-hoc network broadcasts presence information to an adjacent wireless terminal. The wireless terminal that has received the presence information generates routing information corresponding to the presence information and further transmits this routing information to an adjacent wireless terminal. As a result, wireless terminals in the network are notified of the routing information related to the new wireless terminal.

As a related art, the following route information relay method has been proposed. Each node connected to an ad-hoc network receives routing information from adjacent nodes. Each node acquires quality information indicating the quality of routes indicated by the route information with respect to the received route information. Each node determines whether or not a plurality of pieces of route information in which nodes that are the destinations of packets are identical are received for each predetermined period with respect to the received route information. As a result of the determination, if the plurality of pieces of route information in which the nodes that are the destinations are identical have been received, each node compares quality information for each of the plurality of pieces of route information received and selects route information corresponding to the quality information indicated to be the highest quality as a result of the comparison. Each node relays the selected route information to the adjacent nodes. (See, for example, Japanese Laid-open Patent Publication No. 2009-267532.)

For conventional ad-hoc networks, however, measures are insufficient for problems caused by hidden terminals. In the following, problems caused by hidden terminals will be described with reference to FIG. 1.

A node GW and nodes A-E are connected to an ad-hoc network illustrated in FIG. 1. Assume that the node A can perform favorable communication with the node GW. Although the nodes B and C can receive radio waves from the node GW, the quality of their communication with the node GW is not favorable. Radio waves from the node GW do not reach the nodes D and E. The node GW collects data from the nodes A-E.

In the ad-hoc network above, the node B holds the following routing information.

"When a destination of a data packet is node GW, this data packet is transmitted or forwarded to node A."

In this case, when the node B generates a data packet addressed to the node GW, the node B transmits this data packet to the node A. By so doing, the node A forwards the data packet received from the node B to the node GW. As a result, the node GW receives data of the node B. In this case, the node GW returns to the node A an ACK packet corresponding to the received data packet. Hereinafter, assume that the node B transmits data packets to the node GW via similar routes if necessary. In this case, the node A receives the data packet from the node B and receives the ACK packet from the node GW. However, the node GW and the node B can communicate with each other. Accordingly, the node GW and the node B can utilize, for example, CSMA/CA (Carrier Sense Multiple Access Collision Avoidance) to control their transmission timings. As a result, a packet collision which would occur at the node A is avoided or suppressed.

The node D holds the following routing information. "When a destination of data packet is node GW, this data packet is transmitted or forwarded to node A."

In this case, as with the node B, the node D transmits the data packet to the node A. By so doing, the node A forwards the received data packet to the node GW, and the node GW returns an ACK packet corresponding to the received data packet to the node A. In this case, the node A receives the data packet from the node D and receives the ACK packet from the node GW.

However, radio waves from the node GW do not reach the node D. And radio waves from the node D do not reach the node GW. That is, the node D is a "hidden terminal" for the node GW, and the node GW is a "hidden terminal" for the node D. Thus, the node GW and the node D are incapable of performing transmission timing control to avoid a packet collision. As a result, when the node D transmits to the node A a data packet addressed to the node GW, a packet collision may occur at the node A.

The node D may relay a data packet transmitted from another node (e.g., the node E) and addressed to the node GW. In this case, the node D forwards the data packet transmitted from the node E to the node A, and the node A forwards this data packet to the node GW. And the node GW returns corresponding ACK packet to the node A. Accordingly, also in this case, a packet collision may occur at the node A.

As described above, when each node (a wireless terminal or a wireless communication device) forwards a packet by simply following routing information without considering a hidden terminal, the occurrence frequency of packet collisions increases. An increased occurrence frequency of packet collisions decreases a communication speed, causing a risk of congestion. That is, in the prior art, measures are insufficient for problems caused by hidden terminals, so communication efficiency decreases in some situations.

SUMMARY

According to an aspect of the embodiments, a wireless communication device used in a wireless network to which a plurality of wireless communication devices are connected, the wireless communication device includes: a storage configured to store information that identifies an adjacent wireless communication device; an obtaining unit configured to obtain, from a first wireless communication device among the adjacent wireless communication devices, information that identifies a second wireless communication device that is adjacent to the first wireless communication device; a selector configured to select an adjacent wireless communication device in accordance with a destination of data; and a transmitter configured to transmit the data to the adjacent wireless communication device selected by the selector. The selector decreases a priority of the first wireless communication device in selecting the adjacent wireless communication device when the information that identifies the second wireless communication device is not stored in the storage.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a configuration of a wireless network in accordance with an embodiment.

FIG. 3 illustrates a configuration of a node device.

FIG. 6 illustrates an example of a link table.

FIG. 7 illustrates an example of a routing table.

FIG. 8 illustrates a format of a Hello packet.

FIG. 10 illustrates examples of cycle table.

FIGS. 12A-12D, 13A-13D and 14A-14D illustrate examples of a route selection method.

FIG. 15 is a flowchart illustrating a process of updating a link table.

FIG. 16 and FIG. 17 are flowcharts illustrating a process of updating a routing table.

FIG. 19 is a flowchart illustrating a process of calculating an evaluation value.

FIG. 21 illustrates a route selection method in accordance with another embodiment.

DESCRIPTION OF EMBODIMENTS

FIG. 2 illustrates a configuration of a wireless network in accordance with an embodiment. The wireless network in accordance with the embodiment is an ad-hoc network to which a plurality of wireless terminals are connected. The wireless terminal may hereinafter be referred to as "node device" or simply as "node". In the example illustrated in FIG. 2, the wireless network includes nodes n1-n14.

In FIG. 2, dashed lines connecting nodes to each other indicate wireless links. As an example, the node n6 has wireless links connected to the nodes n3, n5, n10 and n11. That is, radio waves (i.e., a wireless signal) transmitted from the node n6 reach the nodes n3, n5, n10 and n11, and radio waves transmitted from each of the nodes n3, n5, n10 and n11 reach the node n6. The following descriptions are based on the assumption that a set of nodes connected to each other via a wireless link are "adjacent" to each other. That is, the nodes n3, n5, n10 and n11 are adjacent to the node n6. In other words, the nodes n3, n5, n10 and n11 are "adjacent nodes" of the node n6.

Each node periodically broadcasts a Hello packet. In the embodiment, however, "broadcast" does not mean that a packet is transmitted to all nodes but that a packet is transmitted to all adjacent nodes. Thus, as an example, the node n6 transmits a Hello packet to the nodes n3, n5, n10 and n11. In this case, the nodes n3, n5, n10 and n11 do not forward to another node the Hello packet received from the node n6.

Hello packets are used to report to another node that a node is present. As an example, when the node n6 broadcasts a Hello packet, the nodes n3, n5, n10 and n11 receive this Hello packet. Accordingly, the node n3 recognizes that the node n6 is present as an adjacent node. Similarly, the nodes n5, n10 and n11 recognize that the node n6 is present as an adjacent node.

As described above, Hello packets are transmitted from each node. Thus, as an example, when the node n3 transmits a Hello packet, the nodes n1, n2 and n6 receive this Hello packet. In this case, the nodes n1, n2 and n6 recognize that the node n3 is present as an adjacent node. In this way, each node recognizes its adjacent node.

FIG. 3 illustrates a configuration of a node device (i.e., a wireless communication device). A node device 1 includes a communication unit 10, a memory unit 20, and a controller 30. The communication unit 10 includes an antenna, a transmitter, and a receiver and provides a wireless interface. The memory unit 20 is, for example, a semiconductor memory and is used by the controller 30. The memory unit 20 includes a nonvolatile memory. The controller 30 includes a CPU and controls an operation of the node device 1. Although not particularly illustrated, the node device 1 may include an input interface to which an input device is connected and/or an output interface to which an output device is connected.

Figure 4:
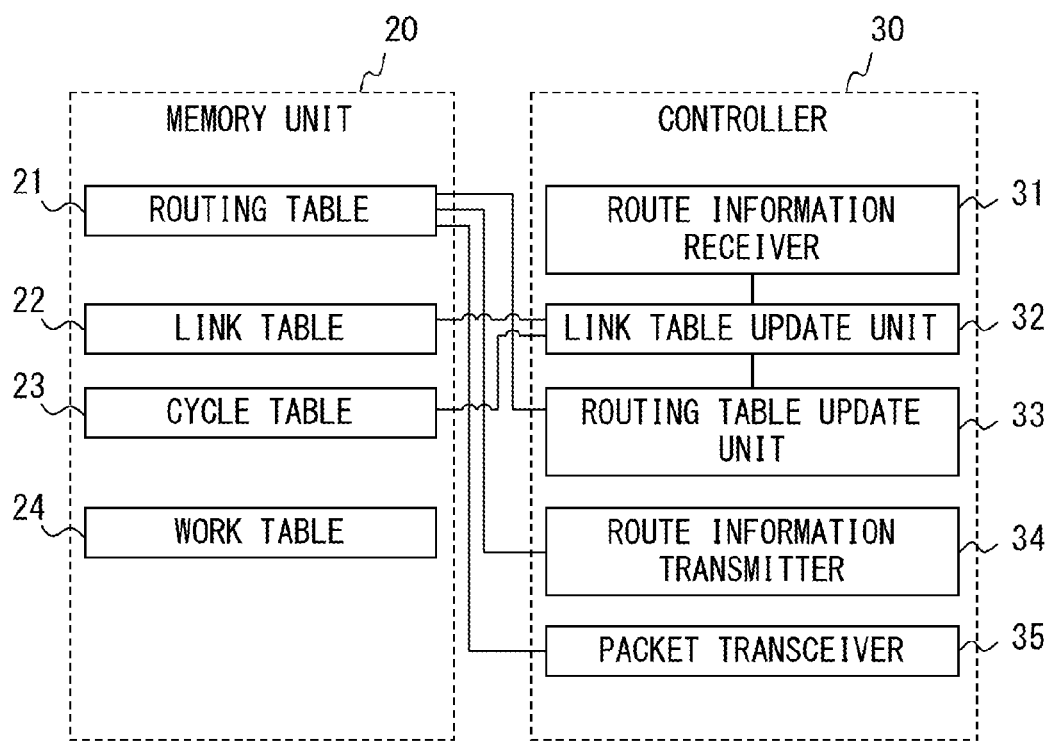
FIG. 4 is a block diagram illustrating functions of a node device.

FIG. 4 is a block diagram illustrating functions of a node device. Note that functions not directly related to establishing a wireless network are not illustrated in FIG. 4.

The memory unit 20 stores data processed by the controller 30. The memory unit 20 stores a routing table 21, a link table 22, a cycle table 23, and a work table 24.

The routing table 21 stores route information. The route information indicates a route through which a packet is transmitted to a destination wireless terminal. In other words, the route information indicates a correspondence between a destination node of a packet and an adjacent node that relays the packet. The routing table 21 also stores quality information that indicates a quality of a route specified by the route information. When a route information receiver 31 receives a Hello packet, the routing table 21 is updated by a routing table update unit 33.

The link table 22 stores link information. The link information indicates a quality of a link between a node and its adjacent node. When the route information receiver 31 receives a Hello packet, the link table 22 is updated by a link table update unit 32.

The cycle table 23 stores cycle information for each adjacent node. The cycle information indicates a cycle in which a Hello packet transmitted from an adjacent node is received. When the route information receiver 31 receives a Hello packet, the cycle table 23 is updated by the link table update unit 32. In this example, the cycle information is used to calculate an evaluation value or link weight of a link to or from an adjacent node. The work table 24 has the same structure as the routing table 21 and temporarily stores the route information and the quality information to be stored in the routing table 21.

The controller 30 includes the route information receiver 31, the link table update unit 32, the routing table update unit 33, a route information transmitter 34, and a packet transceiver 35. In this example, by executing a program with a processor, the controller 30 provides the route information receiver 31, the link table update unit 32, the routing table update unit 33, the route information transmitter 34, and the packet transceiver 35. The program may be stored in a nonvolatile memory of the memory unit 20 in advance. The program may be provided from a removable recording medium to the node device 1. The removable recording medium is, for example, a CD-ROM, a DVD, or a semiconductor memory such as a USB memory. In addition, the program may be provided from a program server via a network to the node device 1.

The route information receiver 31 receives a Hello packet from an adjacent node and obtains route information from this Hello packet. As will be described later, the Hello packet is used to report that a node is present and to transmit the route information. The route information receiver 31 passes the received Hello packet to the link table update unit 32 and the routing table update unit 33.

The link table update unit 32 updates link information stored in the link table 22. In particular, the link table update unit 32 updates link information stored in the link table 22 according to a Hello packet received by the route information receiver 31. In the updating of the link information, the link table update unit 32 also updates the cycle information stored in the cycle table 23 and updates the link information according to the updated cycle information.

The routing table update unit 33 updates route information stored in the routing table 21. In particular, the routing table update unit 33 updates route information stored in the routing table 21 according to a Hello packet received by the route information receiver 31.

The route information transmitter 34 generates a Hello packet according to route information stored in the routing table 21 and link information stored in the link table 22. The route information transmitter 34 broadcasts the generated Hello packet to an adjacent node.

The packet transceiver 35 receives a packet from an adjacent node. Moreover, the packet transceiver 35 references the routing table 21 and specifies an adjacent node corresponding to a destination of the received packet. The packet transceiver 35 transmits or forwards the received packet to the specified adjacent node.

The link table 22 is an example of a storage configured to store information that identifies an adjacent wireless communication device. The route information receiver 31 is an example of an obtaining unit configured to obtain information that identifies a second wireless communication device that is adjacent to a first wireless communication device. The routing table update unit 33 is an example of a selector configured to select an adjacent wireless communication device for each destination. The packet transceiver 35 is an example of a transmitter configured to transmit a data packet to the adjacent wireless communication device selected by the selector. The route information transmitter 34 is an example of a report unit configured to report the evaluation value to the adjacent wireless communication device.

Figure 5:
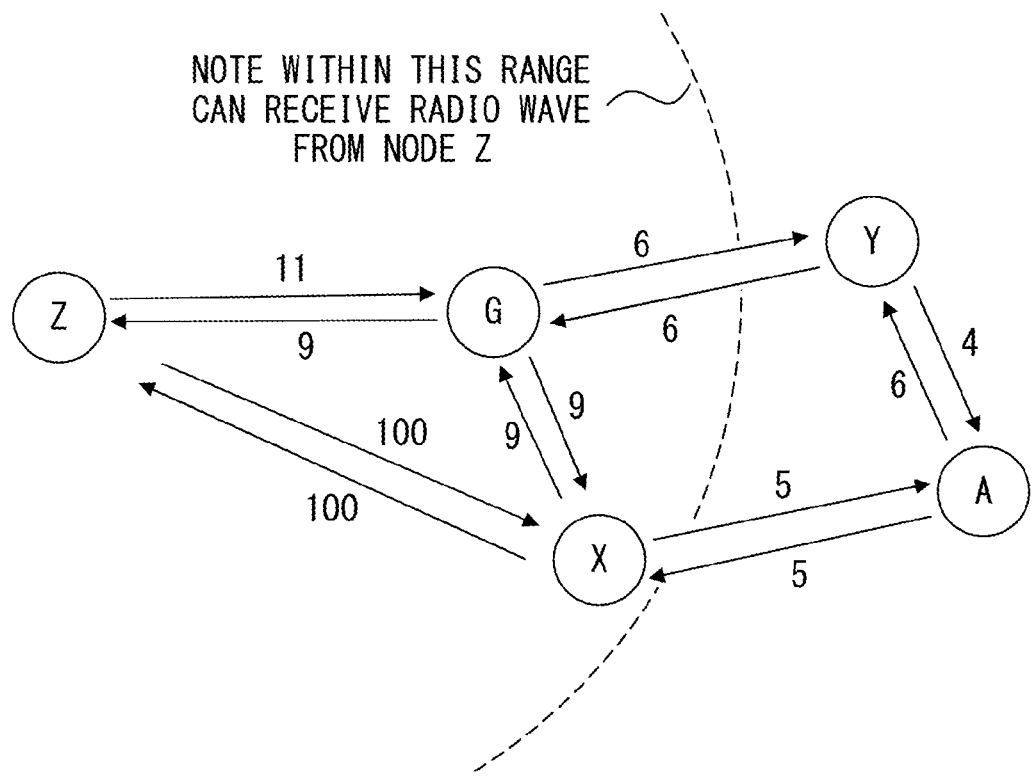
FIG. 5 illustrates link weights.

FIG. 5 illustrates link weights. Note that only some nodes (G, X, Y, Z and A) from among many nodes included in a wireless network are depicted in FIG. 5.

The nodes G and X are adjacent to the node Z. The nodes X, Y and Z are adjacent to the node G. The nodes G, Z and A are adjacent to the node X. The nodes G and A are adjacent to the node Y. The nodes X and Y are adjacent to the node A. "Adjacent" indicates that radio waves from a node reach another node and radio waves from the latter node reach the former node.

Link weight is an indicator of the quality or the cost of communication of a wireless link between nodes. In the embodiment, the link weight of a high-quality link is small, and the link weight of a low-quality link is large. The link weight of a link between nodes is calculated according to a pair of link evaluation values. As an example, the evaluation value of the link from the node G to the node Z is "9", and the evaluation value of the link from the node Z to the node G is "11". The link weight of the link between the nodes is expressed as the average of the pair of link evaluation values. Thus, the link weight of the link between the nodes G and Z is "10". Similarly, the link weight of the link between the nodes X and Z is "100". That is, in this case, the quality of the link between the nodes G and Z is higher than that between the nodes X and Z. A method for detecting a link evaluation value will be described hereinafter.

FIG. 6 illustrates an example of the link table 22. As an example, FIG. 6 depicts the link table 22 provided in the node G illustrated in FIG. 5.

Link information related to a link connected to an adjacent node is stored in the link table 22. The link information includes "adjacent node", "outgoing-link evaluation value", "incoming-link evaluation value", and "link weight". "adjacent node" identifies a node to which a link is connected. "outgoing-link evaluation value" indicates the quality of an outgoing link for an adjacent node. "incoming-link evaluation value" indicates the quality of an incoming link for the adjacent node. "link weight" indicates the average of "outgoing-link evaluation value" and "incoming-link evaluation value".

As an example, the link information stored in a first record illustrated in FIG. 6 indicates the following.
Adjacent node: Z
Outgoing-link evaluation value (the quality of the link from the node Z to the node G): 11
Incoming-link evaluation value (the quality of the link from the node G to the node Z): 9
Link weight (the quality of the link between the node G and the node Z): 10

FIG. 7 illustrates an example of the routing table 21. As an example, FIG. 7 depicts the routing table 21 provided in the node Y illustrated in FIG. 5.

For each destination node, route information and quality information are stored in the routing table 21. In particular, "destination node", "adjacent node", "route weight", "link weight", "hidden-terminal weight", and "evaluation value" are registered in the routing table 21. "destination node" identifies a destination node of a packet. "adjacent node" indicates an adjacent node located on an optimum route to transmit a packet to the destination node. "route weight" indicates the cost of communication of a route from "adjacent node" to "destination node". In particular, "route weight" indicates the sum of the link weights of links on the route from "adjacent node" to "destination node". "link weight" indicates the link weight of a link connected to "adjacent node". "hidden-terminal weight" is determined in accordance with whether or not a hidden terminal is present on a route to the destination node. As an example, "hidden-terminal weight=0" when a hidden terminal is not present, and "hidden-terminal weight=10" when a hidden terminal is present. "evaluation value" corresponds to the total cost of communication related to a route to the destination node, and "evaluation value" is calculated from, for example, the sum of "route weight", "link weight", and "hidden-terminal weight".

As an example, route information and quality information related to the destination node G are stored in the first record illustrated in FIG. 7. When the destination node is an adjacent node, "destination node" and "adjacent node" are identical with each other. Thus, "node G" is also written in "adjacent node". As illustrated in FIG. 5, "link weight" of the link between the node Y and the node G is "6". In addition, when the destination node is an adjacent node, both "route weight" and "hidden-terminal weight" are 0. Accordingly, "6" is written in "evaluation value" for the destination node G.

Route information and quality information for the destination node Z are stored in the second record illustrated in FIG. 7. In this example, the "node G" is written as "adjacent node". That is, a route via the node G is registered in the second record as a route from the node Y to the node Z. "route weight" indicates a value obtained by subtracting the link weight of the link between the nodes Y and G from the sum of link weights of links on the route from the node Y to the node Z. That is, "route weight" indicates the link weight of the link between the nodes G and Z.

"link weight" of the second record, which is the link weight of the link between the nodes Y and G, is recorded as "link weight" in the first record. That is, even when "link weight" is not recorded in the second record, "evaluation value" of the second record can be calculated by referring to the first record. Accordingly, "link weight" may be omitted in a record in which "destination node" is not "adjacent node".

"hidden-terminal weight" is determined in accordance with whether or not direct communication can be established with a forwarding-destination node that is a forwarding destination of a next-hop node. In this example, "adjacent node" corresponds to the next-hop node. The forwarding-destination node corresponds to an adjacent node of the next-hop node on a route to the destination node.

"hidden-terminal weight=0" when direct communication can be established with the forwarding-destination node that is a forwarding destination of the next-hop node, and "hidden-terminal weight=10" when direct communication cannot be established with the forwarding-destination node that is a forwarding destination of the next-hop node. In the example illustrated in FIG. 5, for the route from the node Y to the node Z, a next hop node of the node Y is the node G, and a forwarding-destination node that is a forwarding destination of the node G is the node Z. However, as illustrated in FIG. 5, radio waves transmitted from the node Z do not reach the node Y. That is, the node Y is incapable of communicating directly with the node Z that is the forwarding destination of the next hop node. Thus, "hidden-terminal weight=10" is written in the second record illustrated in FIG. 7. Accordingly, "evaluation value=26" is obtained by adding "link weight of the link between the nodes Y and G=10", "link weight of the link between the nodes G and Z=6", and "hidden-terminal weight=10".

Next, a hidden terminal will be briefly described with reference to FIG. 5. As described above, in FIG. 5, the radio waves from the node Z do not reach the node Y and vice versa. That is, the node Z is a hidden terminal for the node Y, and the node Y is a hidden terminal for the node Z. In this case, the node Y and the node Z are incapable of controlling a transmission timing to avoid a packet collision by using CSMA/CA or the like. Thus, the node Z and the node Y may transmit packets simultaneously. Accordingly, when the node Y and the node Z simultaneously transmit packets, a packet collision occurs at the node G. The occurrence of a packet collision causes, for example, a retransmission process to be performed, thereby lowering the communication speed. As a result, the communication efficiency is decreased.

As described above, when a hidden terminal is present on a route to a destination node, communication efficiency decreases due to a packet collision. In the aforementioned example, accordingly, the node Y lowers the priority of a route connected via the next hop node G in selecting of a route through which a packet is transmitted to the node Z. In the example illustrated in FIG. 7, "hidden-terminal weight=10" is set to the route via the next hop node G to the node Z. In this case, "evaluation value" of the route via the next hop node G to the node Z becomes larger. When there are a plurality of routes for transmitting a packet to the destination node, the node device in accordance with the embodiment selects the route with the smallest evaluation value as an optimum route. Accordingly, the priority of a route to which a hidden-terminal weight is added as described above is lowered in selecting of an optimum route. That is, a route on which a hidden terminal is present is not easily selected as an optimum route.

The node Y reports, to an adjacent node, hidden-terminal information indicating whether or not a hidden terminal is present. This report is achieved by, for example, a Hello packet. In the aforementioned example, the node Y reports, to the node A, the hidden-terminal information indicating that "a hidden terminal is present on a route from the node Y via the node G to the node Z". By so doing, the node A lowers the priority of the route via the node Y in transmitting or forwarding of a packet indicating the node Z as a destination. In this case, the node A transmits or forwards the packet indicating the node Z as a destination to, for example, the node X. As a result, the forwarding of the packet from the node A to the node Z avoids or suppresses a packet collision at the node G, thereby enhancing the communication efficiency.

FIG. 8 illustrates a format of a Hello packet. The Hello packet includes an ad-hoc header, a destination node, an adjacent node, an outgoing-link evaluation value, hidden-terminal information, and an evaluation value. The ad-hoc header includes information required to transmit a packet in an ad-hoc network. The ad-hoc header may include information identifying a source node of the Hello packet. In this example, the destination node, the adjacent node, and the evaluation value are the substantially same as the corresponding entries stored in the routing table illustrated in FIG. 7. The outgoing-link evaluation value indicates the quality of an outgoing link for the adjacent node. The hidden-terminal information corresponds to the hidden-terminal weight recorded in the routing table illustrated in FIG. 7. However, the hidden-terminal information may be information indicating whether or not a hidden terminal is present (e.g., flag information).

Figure 9:
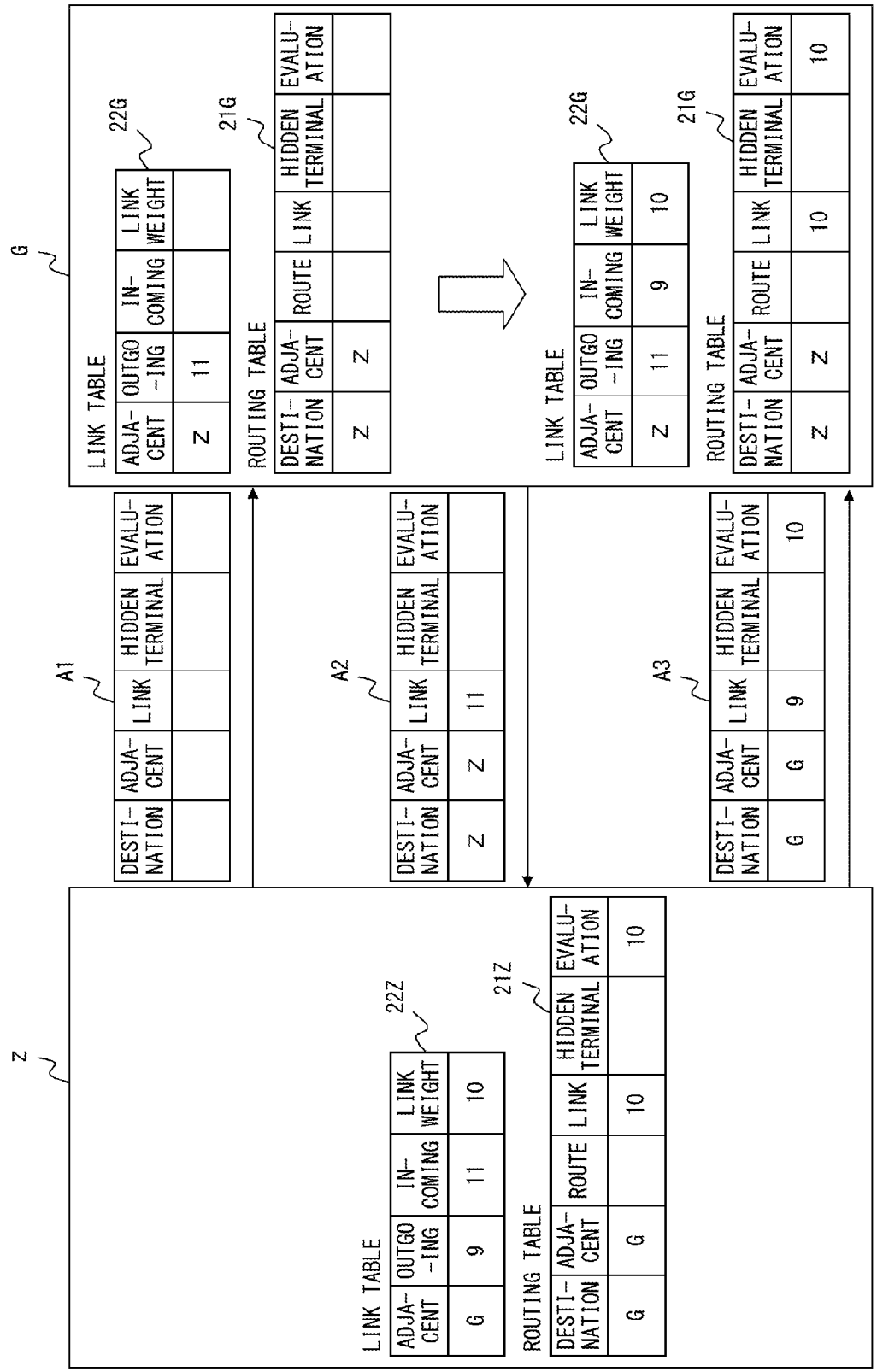
FIG. 9 illustrates generation of a link table and a routing table.

FIG. 9 illustrates generation of a link table and a routing table. In this example, the nodes Z and G newly generate link tables and routing tables. In FIG. 9, a hidden terminal is not taken into consideration.

First, the node Z broadcasts a Hello packet A1. Assume that the node Z has not yet recognized the presence of an adjacent node. In this case the Hello packet A1 does not include valid data.

The Hello packet A1 is received by all nodes within a region which radio waves of the node Z reach. That is, the Hello packet A1 is received by adjacent nodes of the node Z. In this example, only the node G receives the Hello packet A1.

Upon receipt of the Hello packet A1, the node G generates new records in the link table 22G and the routing table 21G. In addition, the node G records the node Z that is the source of the Hello packet A1 in a "adjacent node" of the new record of the link table 22G. In the receiving of the Hello packet A1, the node G detects the quality of the link from the node Z to the node G (i.e., an outgoing link for the node Z). In this example, link evaluation value=11 is obtained. Accordingly, the node G records "outgoing-link evaluation value=11" for "adjacent node Z" in the link table 22G. Moreover, the node G records the node Z as "destination node" and "adjacent node" in the new record of the routing table 21G.

Next, the node G broadcasts a Hello packet A2. At this moment, the node G has recognized that the node Z is an adjacent node from the receiving of the Hello packet A1 from the node Z. The Hello packet A2 stores route information and quality information, both of which indicate the node Z as a destination. That is, "destination node" and "adjacent node" of the routing table 21G are respectively written in "destination node" and "adjacent node" of the Hello packet A2. Using the Hello packet A2, the node G reports, to the node Z, the quality of the link from the node Z to the node G. That is, "outgoing-link evaluation value=11" recorded in the link table 22G of the node G is written in "outgoing-link evaluation value" of the Hello packet A2.

The Hello packet A2 is received by all nodes within a region to which radio waves of the node G reach. That is, the Hello packet A2 is received by adjacent nodes of the node G. In this example, only the node Z receives the Hello packet A2.

Upon receipt of the Hello packet A2, the node Z generates new records in the link table 22Z and the routing table 21Z. In addition, the node Z records the node G that is the source of the Hello packet A2 in "adjacent node" of the new record of the link table 22Z. In the receiving of the Hello packet A2, the node Z detects the quality of the link from the node G to the node Z (i.e., an outgoing link for the node G). In this example, link evaluation value=9 is obtained. Accordingly, the node Z records "outgoing-link evaluation value=9" for "node G" in the link table 22Z.

The node Z reads "outgoing-link evaluation value" from the Hello packet A2. "outgoing-link evaluation value" reported by the Hello packet A2 indicates the quality of the link from the node Z to the node G that has been detected by the node G. That is, "outgoing-link evaluation value" reported by the Hello packet A2 indicates the quality of the incoming link for the node G. The outgoing link for the node G is the incoming link for the node Z. Thus, the node Z writes "outgoing-link evaluation value" reported by the Hello packet A2 in "incoming-link evaluation value" of the link table 22Z. In this example, the node Z records "incoming-link evaluation value=11" for "node G" in the link table 22Z. In addition, the node Z calculates the average of the outgoing-link evaluation value and the incoming-evaluation value and writes the result of calculation in "link weight" of the link table 22Z. In this example, "link weight=10" for the link connected to the adjacent node G is recorded in the link table 22Z.

In addition, the node Z generates in the routing table 21Z a record indicating the node G as a destination. In this case, "adjacent node" is the node G. "link weight" of the link table 22Z is recorded in "link weight" of the routing table 21Z. Moreover, the sum of "link weight" and "route weight" of the routing table 21Z is written in "evaluation value" of the routing table 21Z. In this example, however, the route weight is 0.

Next, the node Z broadcasts a Hello packet A3. At this time, using the Hello packet A3, the node Z reports, to the node G, the quality of the link from the node G to the node Z. That is, "outgoing-link evaluation value=9" recorded in the link table 22Z of the node Z is written in "outgoing-link evaluation value" of the Hello packet A3. "evaluation value=10" recorded in the routing table 21Z is written in "evaluation value" of the Hello packet A3. Moreover, "destination node" and "adjacent node" of the routing table 21Z are respectively written in "destination node" and "adjacent node" of the Hello packet A3.

Upon receipt of the Hello packet A3 from the node Z, the node G updates the link table 22G and the routing table 21G. That is, the node G writes "outgoing-link evaluation value=9" of the Hello packet A3 in "incoming-link evaluation value" of the link table 22G. For the link table 22G, the node G writes the average of "outgoing-link evaluation value" and "incoming-link evaluation value" in "link weight". In addition, using a procedure similar to the aforementioned procedure of the node Z, the node G fills in "link weight" and "evaluation value" of the routing table 21G.

The link tables 22Z and 22G and the routing tables 21Z and 21G generated as described above indicate the following.

Link table 22Z:
(1) Node Z has adjacent node G
(2) Link weight of link between nodes Z and G is "10"
Routing table 21Z:
(1) Destination is node G
(2) Next hop is node G in the transmitting of packet from node Z to the destination node
(3) Link weight of a link from node Z to next hop node is "10"
(4) Evaluation value of a route from node Z to the destination node is "10"
Link table 22G:
(1) Node G has adjacent node Z
(2) Link weight of link between nodes G and Z is "10"
Routing table 21G:
(1) Destination is node Z
(2) Next hop is node Z in the transmitting of packet from node G to the destination node
(3) Link weight of a link from G to next hop node is "10"
(4) Evaluation value of a route from node G to the destination node is "10"

In this way, each node device generates the link table 22 and the routing table 21 by transmitting and receiving Hello packets to and from an adjacent node. As described above, each node device periodically transmits a Hello packet. Thus, every time each node device receives the Hello packet, the node device may update the link table 22 and the routing table 21.

As described above, using the Hello packet, each node device can detect the quality of a link connected to an adjacent node. The node device may detect the quality of a link according to, for example, intervals at which Hello packets are received. That is, in the ad-hoc network in accordance with the embodiment, each node device repeatedly transmits Hello packets in a cycle specified in advance. Accordingly, in the case of a high link quality, time intervals at which the node device receives Hello packets from an adjacent node would become constant. In other words, when the quality of a link is low, variation in the time intervals at which the node device receives Hello packets from an adjacent node becomes great. Accordingly, the node device monitors the cycle at which Hello packets are received using the cycle table 23.

FIG. 10 illustrates examples of the cycle table 23. As an example, FIG. 10 illustrates the cycle table 23 provided in the node Z.

The cycle table 23 is generated for each adjacent node. In this example, the node Z has adjacent nodes G and X. Accordingly, the node Z has a cycle table 23G for recording a cycle on which Hello packets transmitted from the node G are received, and a cycle table 23X for recording a cycle on which Hello packets transmitted from the node X are received. The cycle table 23 (23G and 23X) records "ID", which identifies a received Hello packet, "cycle", which indicates time intervals at which Hello packets are received, and "reception time", which indicates a time at which a Hello packet is received.

Times at which the node Z received Hello packets 1-4 from the node G are recorded in the cycle table 23G. "cycle" is calculated from a difference between the reception times of two consecutive Hello packets. As an example, the reception time of the Hello packet 4 is "0.05", and the reception time of the Hello packet 3 is "0.03". In this case, "cycle=0.02" is obtained.

The node device calculates the evaluation value of a link according to, for example, the standard deviation of "cycle" stored in the cycle table 23. In the example illustrated in FIG. 10, the standard deviation of the cycles on which Hello packets are received from the node G is small, and the standard deviation of the cycles on which Hello packets are received from the node X is large. Accordingly, the quality of the link from the node G to the node Z is high, and an evaluation value of the link is small. Meanwhile, the quality of the link from the node X to the node Z is not high, and an evaluation value of the link is large.

Each node device may detect the quality of a link using another method. As an example, the node device may detect the quality of a link according to a received level of a Hello packet transmitted from an adjacent node (e.g., radio field intensity of a received radio wave).

Figure 11:
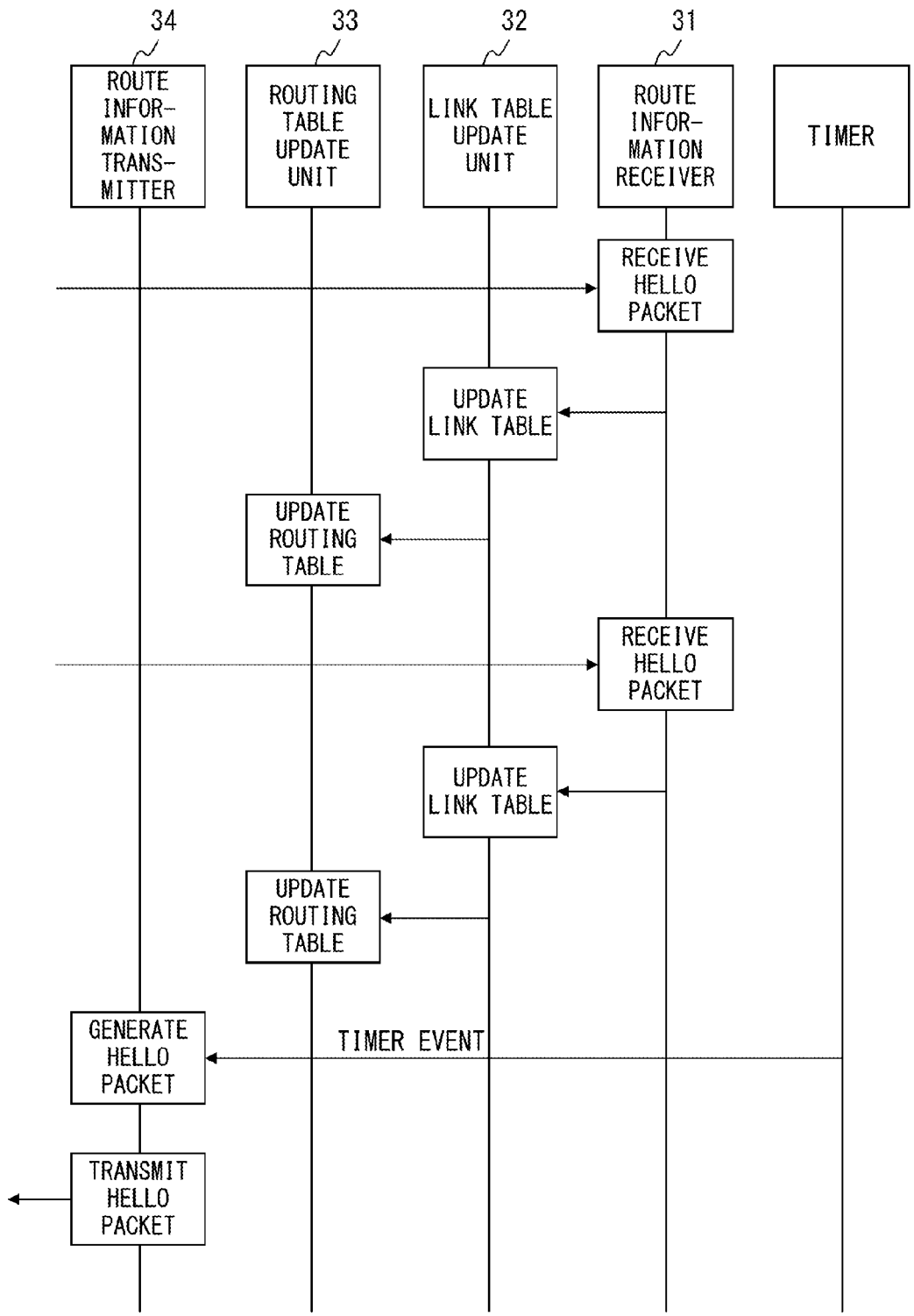
FIG. 11 illustrates a process performed by a node device.

FIG. 11 illustrates an outline of a process performed by a node device. Operations related to transmission and reception of a Hello packet are depicted in FIG. 11. Each node device periodically broadcasts a Hello packet.

The route information receiver 31 receives a Hello packet transmitted from an adjacent node. When the route information receiver 31 receives a Hello packet, the link table update unit 32 updates the link table 22, and the routing table update unit 33 updates the routing table 21. That is, every time the node device receives a Hello packet, the link table 22 and the routing table 21 are updated. The link table update unit 32 writes the reception time of a Hello packet in the cycle table 23.

The node device in FIG. 4 includes a timer (not illustrated). The timer outputs a timer event signal every time a period of time specified in advance passes. When a timer event signal is generated, the route information transmitter 34 generates a Hello packet by referencing the routing table 21 and the link table 22 and broadcasts this Hello packet to an adjacent node.

Next, examples of a route selection method will be described with reference to FIGS. 12A-12D, 13A-13D and 14A-14D. The following descriptions are based on the assumption that the network illustrated in FIG. 5 is established by Hello packets being transmitted and received between the nodes. Assume that each node device has recognized its adjacent node.

<Procedure 1 (FIGS. 12A-12D)>

As illustrated in FIG. 12A, a node Z broadcasts a Hello packet Z. The radio waves transmitted from the node Z reach nodes G and X but do not reach nodes Y and A. Assume that the node Z has already received Hello packets respectively from the nodes G and X and has detected the qualities of links from the node G to the node Z and from the node X to the node Z. In this case, the node Z generates and transmits the Hello packet Z illustrated in FIG. 12B.

The Hello packet Z stores the route information and the quality information, both of which indicate the node G as a destination, and the route information and the quality information, both of which indicate the node X as a destination. As an example, the route information that indicates the node G as a destination indicates that a forwarding destination of the packet is the node G. The quality information that indicates the node G as a destination includes the evaluation value of the link from the node G to the node Z and the evaluation value of the route from the node Z to the node G. Note that the Hello packet may store route information and the quality information for a plurality of destinations.

Upon receipt of the Hello packet Z from the node Z, the node G updates the link table 22 and the routing table 21. In this example, as illustrated in FIG. 12C, the node G stores link information that indicates the link between the nodes G and Z in the link table 22. This link information indicates the following.

(1) Node G has adjacent node Z
(2) Outgoing-link evaluation value (quality of link from node Z to node G) is "11"
(3) Incoming-link evaluation value (quality of link from node G to node Z) is "9"
(4) Link weight (quality of link between nodes G and Z) is "10"

As illustrated in FIG. 12D, the node G stores route information and quality information related to a route from the node G to the node Z in the routing table 21. This route information and this quality information indicate the following.

(1) Destination is node Z
(2) On route from node G to destination node Z, next hop is node Z
(3) Route weight of route from next hop node Z to destination node Z is "0"
(4) Link weight of link from node G to next hop node Z is "10"
(5) Hidden terminal is not present
(6) Evaluation value of route from node G to destination node Z is "10"

Upon receipt of the Hello packet Z from the node Z, the node X also updates the link table 22 and the routing table 21. In this example, as illustrated in FIG. 12C, the node X stores link information that indicates the link between the nodes Z and X in the link table 22. However, the link quality of the link between the nodes Z and X (link weight=100) is very low. Assume that, in this example, the node devices do not register information of a low-quality route in the routing table 21. Accordingly, when the node X receives the Hello packet Z, the node X does not register information related to the destination node Z in the routing table 21.

<Procedure 2 (FIGS. 13A-13D)>

In procedure 2, the node device that receives the Hello packet Z in procedure 1 transmits a Hello packet. Here, descriptions will be given of a procedure with which the node G transmits a Hello packet, and descriptions will not be given of a procedure with which the node X transmits a Hello packet.

As illustrated in FIG. 13A, the node G broadcasts Hello packet G. Radio waves transmitted from the node G reach the nodes Z, Y and X. Assume that the node G has already received Hello packets respectively from the nodes Z, Y and X and has already detected the qualities of the links from the nodes Z, Y and X to the node G. In this case, the node G generates and transmits the Hello packet G illustrated in FIG. 13B. The Hello packet G stores route information and quality information, both of which indicate the node Y as a destination, route information and quality information, both of which indicate the node X as a destination, and route information and quality information, both of which indicate the node Z as a destination.

Upon receipt of the Hello packet G from the node G, the node Y updates the link table 22 and the routing table 21. In this example, as illustrated in FIG. 13C, the node Y stores link information that indicates the link between the nodes Y and G in the link table 22. The link information indicates the following.
(1) Node Y has adjacent node G
(2) Outgoing-link evaluation value (quality of link from node G to node Y) is "6"
(3) Incoming-link evaluation value (quality of link from node Y to node G) is "6"
(4) Link weight (quality of link between nodes Y and G) is "6"

As illustrated in FIG. 13D, the node Y stores route information and quality information related to the routes from the node Y to the nodes G and Z in the routing table 21. The route information and the quality information of the route from the node Y to the node G indicate the following.
(1) Destination is node G
(2) On route from node Y to destination node G, next hop is node G
(3) Route weight of route from next hop node G to destination node G is "0"
(4) Link weight of link from node Y to next hop node G is "6"
(5) Hidden terminal is not present
(6) Evaluation value of route from node Y to destination node G is "6"

The route information and the quality information of the route from the node Y to the node Z indicate the following.
(1) Destination is node Z
(2) On route from node Y to destination node Z, next hop is node G
(3) Route weight of route from next hop node G to destination node Z is "10"
(4) Link weight of link from node Y to next hop node G is "6"
(5) Hidden terminal is present (hidden-terminal weight=10)
(6) Evaluation value of route from node Y to destination node Z is "26"

The node device decides whether or not a hidden terminal is present using, for example, the following method. That is, upon receipt of a Hello packet, the node device specifies a forwarding destination of the next hop for "destination node" of the information stored in the Hello packet. As an example, the node Y specifies a forwarding destination of the next hop for the destination node Z. In the examples illustrated in FIGS. 13A-13D, "adjacent node=G" for "destination node=Z" is recorded in the routing table of the node Y illustrated in FIG. 13D. Thus, on the route from the node Y to the node Z, the next hop is the node G. Meanwhile, as illustrated in FIG. 13B, "adjacent node=Z" for "destination node=Z" is recorded in the Hello packet G transmitted from the node G. Accordingly, on the route from the node Y to the node Z, a forwarding destination of the next hop (i.e., the node G) is the node Z. In this way, the node Y specifies "node Z" as a forwarding destination of the next hop on the route whose destination is the node Z.

Next, the node Y checks whether or not the forwarding destination of the next hop specified as described above (i.e., the node Z) is registered in the link table 22 of the node Y. In this example, as illustrated in FIG. 13C, "node Z" is not registered in the link table of the node Y. In this case, the node Y decides that the node Y is incapable of receiving radio waves from the node Z. That is, the node Y decides that the node Z is a hidden terminal. Accordingly, the node Y writes "hidden-terminal weight=10" in the routing table of the node Y illustrated in FIG. 13D. In addition, the node Y obtains "evaluation value=26" by calculating the sum of "route weight", "link weight", and "hidden-terminal weight".

Upon receipt of the Hello packet G from the node G, the node X updates the link table 22 and the routing table 21. In procedure 1 described above, the node X has already stores the link information of the link between the nodes X and Z in the link table 22 according to the Hello packet Z received from the node Z. Thus, according to the Hello packet G received from the node G, the node X adds the link information that indicates the link between the nodes X and G to the link table 22, as illustrated in FIG. 13C.

As illustrated in FIG. 13D, the node X also stores route information and quality information, both of which relate to the routes from the node X to the nodes G and Z in the routing table 21. Although the link weight and the evaluation value of the route from the node X to the node G are different from those of the route from the node Y to the node G, the route information and the quality information of the route from the node X to the node G are substantially the same as those of the route from the node Y to the node G; accordingly, descriptions are not given of the route from the node X to the node G.

Meanwhile, the route information and the quality information of the route from the node X to the node Z indicate the following.
(1) Destination is node Z
(2) On route from node X to destination node Z, next hop is node G
(3) Route weight of route from next hop node G to destination node Z is "10"
(4) Link weight of link from node Y to next hop node G is "9"
(5) Hidden terminal is not present (hidden-terminal weight=0)
(6) Evaluation value of route from node X to destination node Z is "19"

As with the node Y, the node X detects the presence/absence of a hidden terminal. In this example, the node X first specifies a forwarding destination of the next hop for the destination node Z. In this case, "adjacent node=G" for "destination node=Z" is recorded in the routing table of the node X illustrated in FIG. 13D. Thus, on the route from the node X to the node Z, the next hop is the node G. Meanwhile, as illustrated in FIG. 13B, "adjacent node=Z" for "destination node=Z" is recorded in the Hello packet G transmitted from the node G. Accordingly, on the route from the node X to the node Z, a forwarding destination of the next hop (i.e., the node G) is the node Z. In this way, the node X specifies "node Z" as a forwarding destination of the next hop on the route whose destination is the node Z.

Next, the node X checks whether or not the forwarding destination of the next hop specified as described above (i.e., the node Z) is registered in the link table 22 of the node X. In this example, as illustrated in FIG. 13C, "node Z" is registered in the link table of the node X. In this case, the node X may receive radio waves from the node Z, and the node Z may receive radio waves from the node X. That is, the node X decides that "node Z is not hidden terminal". Accordingly, in the routing table of the node X illustrated in FIG. 13D, "0" is set as "hidden-terminal weight" corresponding to "destination node=Z". Thus, the node X obtains "evaluation value=19" by calculating the sum of "route weight", "link weight", and "hidden-terminal weight".

Figure 1:
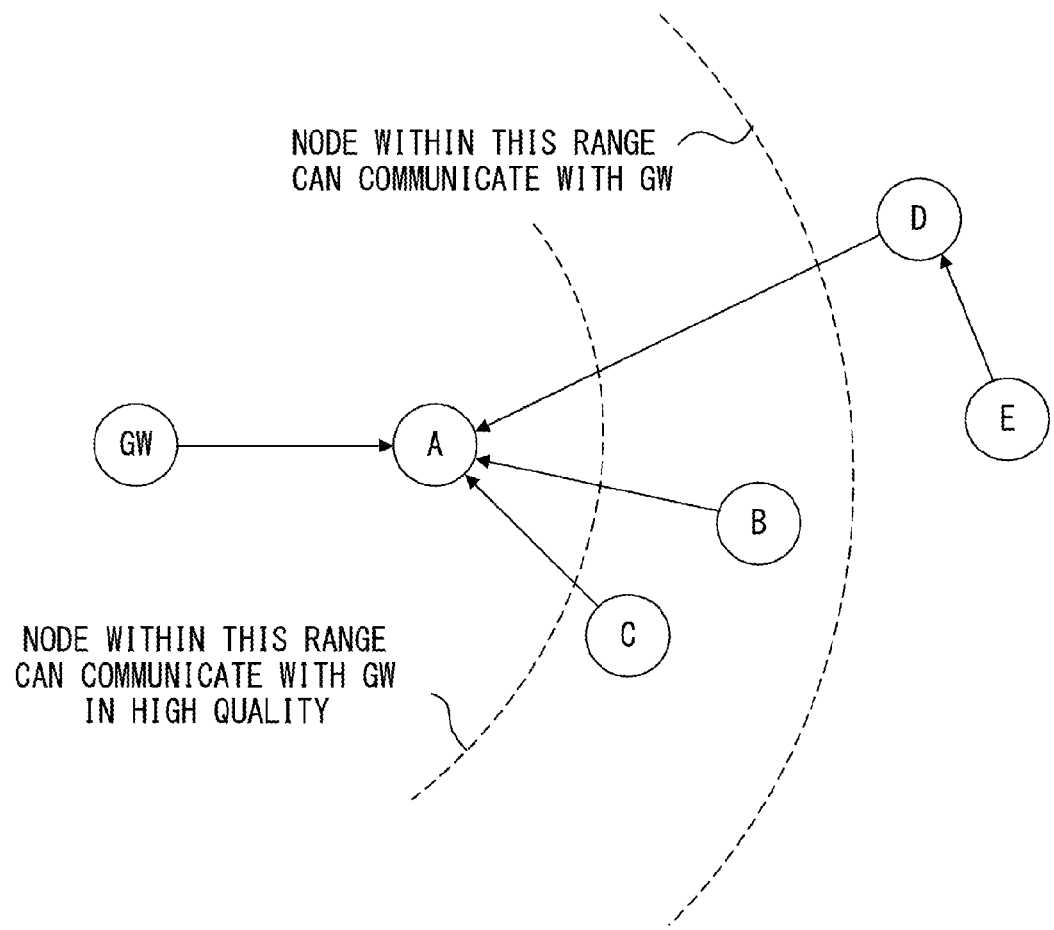
FIG. 1 illustrates a problem caused by a hidden terminal.

As described above, each node device decides whether or not a forwarding destination of the next hop on the route to a destination node is a hidden terminal. When the forwarding destination of the next hop is a hidden terminal, the communication efficiency decreases due to the occurrence of a packet collision, as described above with reference to FIG. 1. Accordingly, when a forwarding destination of the next hop on a route to a destination node is a hidden terminal, the node device increases the evaluation value for this route by adding "hidden-terminal weight" to this value. As a result, the priority of the route is lowered.

Meanwhile, when a forwarding destination of the next hop on the route to a destination node is not a hidden terminal, the node device can avoid a packet collision using, for example, CSMA/CA. Thus, when a forwarding destination of the next hop on the route to a destination node is not a hidden terminal, "hidden-terminal weight" is not added to the evaluation value for the route.

<Procedure 3 (FIGS. 14A-14D)>

In procedure 3, the node devices that receive the Hello packet G in procedure 2 transmit a Hello packet. In the following, a procedure will be described with which the node X transmits the Hello packet X and the node Y transmits the Hello packet Y.

Figures 14A, 14B, 14C, 14D:
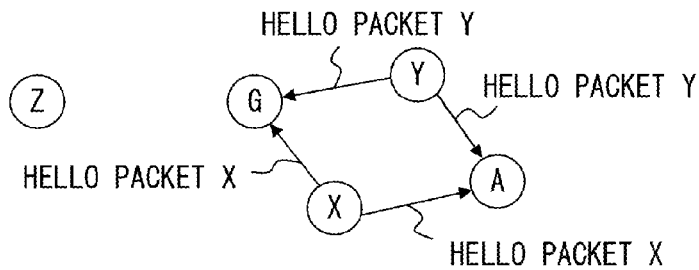

As illustrated in FIG. 14A and FIG. 14B, the node X generates and transmits a Hello packet X that includes route information and quality information which indicate the node G, Z and A as destinations. The route information and the quality information stored in the Hello packet X for each destination node are generated from the routing table 21 of the node X illustrated in FIG. 13D and the link table 22 of the node X illustrated in FIG. 13C. However, outgoing-link evaluation values are obtained by referencing the link table 22 of the node X illustrated in FIG. 13C. Note that information that indicates the node A as a destination is not illustrated in FIG. 13D.

Similarly, as illustrated in FIG. 14A and FIG. 14B, the node device Y transmits a Hello packet Y that includes route information and quality information which indicate the node G, Z and A as destinations. The route information and the quality information stored in the Hello packet Y for each destination are generated from the routing table 21 of the node Y illustrated in FIG. 13D and the link table 22 of the node Y illustrated in FIG. 13C.

The node A receives the Hello packet X from the node X and the Hello packet Y from the node Y. Accordingly, the node A updates the link table 22 and the routing table 21 according to the Hello packets X and Y. In this example, as illustrated in FIG. 14C, the node A stores the link information that indicates the link between the nodes A and X and the link information that indicates the link between the nodes A and Y in the link table 22.

According to the Hello packets X and Y, the node A also registers route information and quality information for each route from the node A to a destination node. In FIG. 14D, route information and quality information are illustrated for two routes from the node A to the node Z. Information related to another destination node is not illustrated in FIG. 14D.

The route information and the quality information of the route from the node A via the node X to the node Z indicate the following.

(1) Destination is node Z
(2) On route from node A to destination node Z, next hop is node X
(3) Weight of route from next hop node X to destination node Z is "19"
(4) Link weight of link from node A to next hop node X is "5"
(5) Hidden terminal is present (hidden-terminal weight=10)
(6) Evaluation value of route from node A to destination node Z is "34"

"adjacent node (i.e., next hop node)=X" is obtained by detecting a source of the Hello packet X. "route weight=19" is obtained from "evaluation value" corresponding to "destination node=Z" stored in the Hello packet X. "link weight=5" is obtained from the link table 22 of the node A illustrated in FIG. 14C. As described above with reference to FIGS. 13A-13D, "hidden-terminal weight" is determined according to whether or not a forwarding destination of a next hop is registered in the link table 22. On this route, the next hop is the node X, and its forwarding destination is the node G. However, as illustrated in FIG. 14C, the node G is not registered in the link table 22 of the node A. Thus, "hidden-terminal weight=10" is obtained. Accordingly, for the route from the node A via the node X to the node Z, "evaluation value=34" is obtained by adding "route weight", "link weight", and "hidden-terminal weight".

Similarly, the route information and the quality information of the route from the node A via the node Y to the node Z indicate the following.

(1) Destination is node Z
(2) On route from node A to destination node Z, next hop is node Y
(3) Weight of route from next hop node Y to destination node Z is "26"
(4) Link weight of link from node A to next hop node Y is "5"
(5) Hidden terminal is present (hidden-terminal weight=10)
(6) Evaluation value of route from node A to destination node Z is "41"

"adjacent node (i.e., next hop node)=Y" is obtained by detecting a source of the Hello packet Y. "route weight=26" is obtained from "evaluation value" corresponding to "destination node=Z" stored in the Hello packet Y. "link weight=5" is obtained from the link table 22 of the node A illustrated in FIG. 14C. As described above, "hidden-terminal weight" is determined according to whether or not a forwarding destination of a next hop is registered in the link table 22. On this route, the next hop is the node Y, and its forwarding destination is the node G. However, as illustrated in FIG. 14C, the node G is not registered in the link table 22 of the node A. Thus, "hidden-terminal weight=10" is obtained. Accordingly, for the route from the node A via the node Y to the node Z, "evaluation value=41" is obtained by adding "route weight", "link weight", and "hidden-terminal weight".

The node A selects an optimum route for each destination node. A route with the smallest "evaluation value" in the routing table 21 is selected as an optimum route. Thus, in the example illustrated in FIGS. 14A-14D, the node A selects a route via the node X as a route whose destination is the node Z.

The route from the node A via the node X to the node Z (hereinafter referred to as "route A/X/Z") is compared with the route from the node A via the node Y to the node Z (hereinafter referred to as "route A/Y/Z"). In the example illustrated in FIG. 5, the sum W (A/X/Z) of the link weights of the route A/X/Z and the sum W (A/Y/Z) of the link weights of the route A/Y/Z are as follows.

$$W(A/X/Z)=(5+5)/2+(9+9)/2+(11+9)/2=24$$

$$W(A/Y/Z)=(6+4)/2+(6+6)/2+(11+9)/2=21$$

That is, when only link weights are considered, the evaluation value of the route A/Y/Z is smaller than that of the route A/X/Z. The situation that the node G is a hidden terminal for the node A applies to both the route A/X/Z and the route A/Y/Z.

On the route A/X/Z, however, the node Z is not a hidden-terminal for the node X, and hence, at the node X, the hidden-terminal weight related to the node Z is 0. By contrast, on the route A/Y/Z, the node Z is a hidden terminal for the node Y, and hence, at the node Y, "hidden-terminal weight=10" related to the node Z is added. As a result, the evaluation value of the route A/Y/Z (that is, 41) finally obtained at the node A for the destination node Z is larger than the evaluation value of the route A/X/Z (that is 34) finally obtained at the node A for the destination node Z.

In the ad-hoc network in accordance with the embodiment, each node device references the routing table 21 according to the destination of a packet and selects a route with the smallest evaluation value from among the evaluation values of routes corresponding to this destination. Thus, when the node A generates or receives a packet whose destination is the node Z, the node A selects the route A/X/Z from the routing table illustrated in FIG. 14D. That is, the node A transmits or forwards the packet to the node X. Accordingly, the packet is transmitted to the node Z via the nodes X and G. In this case, since the nodes X and Z control transmission timings using CSMA/CA, a packet collision at the node G is avoided or suppressed.

As described above, according to the route selection method in accordance with the embodiment, in the transmitting of a packet to a destination in the ad-hoc network, a route on which a hidden terminal is present is not easily selected, and a route on which a hidden terminal is not present is easily selected. Thus, in the ad-hoc network in accordance with the embodiment, packet collisions are suppressed, and the communication efficiency increases.

In the examples illustrated in FIGS. 12A-12D, 13A-13D and 14A-14D, hidden-terminal weights are cumulatively added in the process of route information propagating via node devices. As an example, in FIGS. 13A-13D, hidden-terminal weights corresponding to the node Z are added by the node Y; in FIGS. 14A-14D, hidden-terminal weights corresponding to the node G are added by the node A. Thus, increasing the number of hidden terminals on a route to a destination node increases the total evaluation value of the route, so this route is not easily selected as an optimum route.

Next, with reference to flowcharts, descriptions will be given of a process of updating the link table 22, a process of updating the routing table 21, a process of calculating an evaluation value, and a process of transmitting a packet.

FIG. 15 is a flowchart illustrating a process of updating the link table 22. This process is performed by the link table update unit 32 at each node.

In steps S1-S2, the link table update unit 32 waits for a Hello packet transmitted from an adjacent node. Upon receipt of the Hello packet, the link table update unit 32 specifies a source node of the Hello packet.

In step S3, the link table update unit 32 decides whether or not a cycle table is present that corresponds to the source node specified in step S2. When a corresponding cycle table is not present, the link table update unit 32 creates in step S4 a cycle table corresponding to the source node and a record identified as "ID=1". In step S5, the link table update unit 32 writes the reception time of the Hello packet in this record. As an example, the link table update unit 32 writes reception time "0:00" as an initial value. In step S6, the link table update unit 32 sets an initial value of "cycle" for the record. The initial value of the cycle is, for example, "0:00". However, the link table update unit 32 does not necessarily need to set the initial value of the cycle.

When a corresponding cycle table is already present (step S3: Yes), the link table update unit 32 adds in step S7 a new record to the top of the cycle table. In step S8, the link table update unit 32 writes the reception time of the Hello packet in the new record. In step S9, the link table update unit 32 calculates a difference between the reception time newly written in step S8 and the reception time of the immediately previous Hello packet and sets this difference as "cycle". In step S10, the link table update unit 32 calculates a standard deviation of "cycle". Moreover, the link table update unit 32 obtains an outgoing-link evaluation value from the standard deviation of the cycle. An expression of a relationship between the standard deviation of the cycle and the outgoing-link evaluation value is not particularly limited, but a larger standard deviation makes a larger evaluation value.

In step S11, the link table update unit 32 creates in the link table a record of the source node of the Hello packet. However, when the link table already includes a record of the source node, the link table update unit 32 does not create a new record but identifies the record of the source node. In step S12, the link table update unit 32 associates an outgoing-link evaluation value obtained according to the received Hello packet with the source node and stores (or overwrites) this value in the link table.

In step S13, the link table update unit 32 decides whether or not the received Hello packet includes an outgoing-link evaluation value. When the Hello packet does not include an outgoing-link evaluation value, the link table update unit 32 sets (or overwrites) in step S14 the outgoing-link evaluation value calculated in step S10 in the link table as "link weight".

When the Hello packet includes an outgoing-link evaluation value, in step S15, the link table update unit 32 associates the outgoing-link evaluation value included in the received Hello packet with the source node indicated in the link table and stores (or overwrites) this value as an incoming-link evaluation value. In step S16, the link table update unit 32 calculates an average of the outgoing-link evaluation value and the incoming-link evaluation value and sets (or overwrites) the result of the calculation in the link table as "link weight".

As described above, upon receipt of a Hello packet from an adjacent node, the link table update unit 32 updates the link table 22. As a result, link information corresponding to a link connected to an adjacent node is stored in the link table 22 of each node device.

Figure 16:
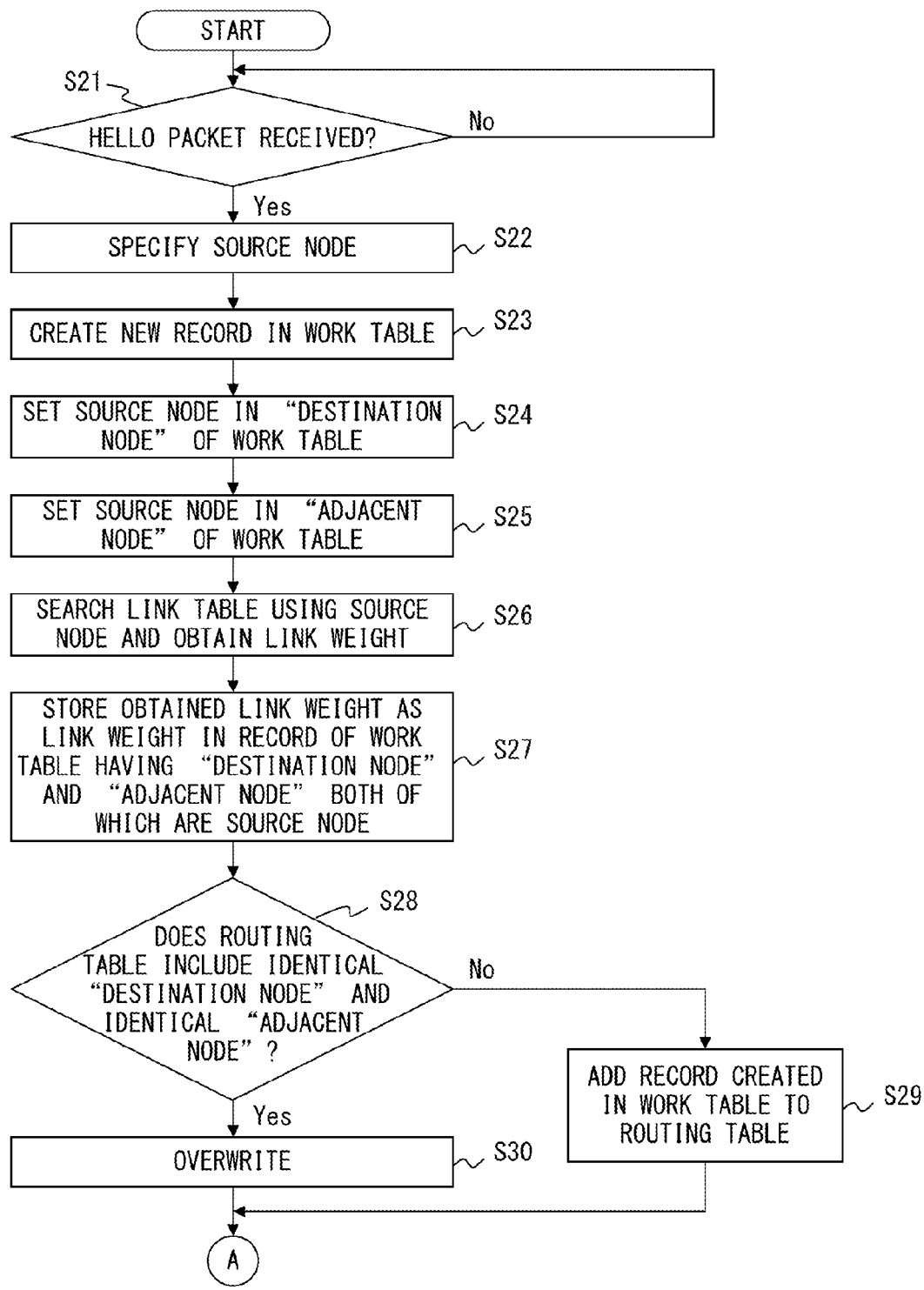

FIG. 16 and FIG. 17 are flowcharts illustrating a process of updating the routing table 21. The process is performed by the routing table update unit 33 at each node.

The processes of steps S21 and S22 are substantially the same as those of steps S1 and S2. However, steps S21 and S22 are performed by the routing table update unit 33. That is, the routing table update unit 33 specifies a source node of a received Hello packet.

In step S23, the routing table update unit 33 creates a new record in the work table 24. In steps S24-S25, the routing table update unit 33 sets the source node specified in step S22 as "destination node" and "adjacent node" of the new record.

In step S26, the routing table update unit 33 searches the link table 22 using the specified source node and obtains "link weight" corresponding to the source node of the Hello packet. In step S27, for the work table 24, the routing table update unit 33 writes the link weight obtained in step S26 in "link weight" of a record having "destination node" and "adjacent node", both of which are identical to the source node of the Hello packet.

In step S28, the routing table update unit 33 decides whether or not the routing table 21 includes a record having "destination node" and "adjacent node", both of which are identical with those of a record created in the work table 24. When such a record is not present in the routing table 21, the routing table update unit 33 adds in step S29 the record created in the work table 24 to the routing table 21. Meanwhile, when the aforementioned record is present in the routing table 21, the routing table update unit 33 updates in step S30 the routing table 21 in accordance with the contents of the corresponding record of the work table 24.

In step S31, the routing table update unit 33 decides whether or not a Hello packet includes information. When the Hello packet does not include information, steps S32-S42 are skipped, and the process of the routing table update unit 33 moves to step S43. Meanwhile, when the Hello packet includes information, the routing table update unit 33 performs the processes of steps S32-S42 for each destination node.

In step S32, the routing table update unit 33 decides whether or not "destination node" or "adjacent node" of the route information stored in the Hello packet is the node that includes this routing table update unit 33. Note that the node that is performing this flowchart may be called "local node". When at least one of "destination node" or "adjacent node" is the local node, steps S33-S40 are skipped, and the process of the routing table update unit 33 of this node moves to step S41.

Meanwhile, when neither "destination node" nor "adjacent node" is the local node (step S32: No), the routing table update unit 33 of this node creates in step S33 a new record in the work table 24. In step S34, the routing table update unit 33 writes "destination node" stored in the Hello packet in "destination node" of the record created in step S33. In step S35, the routing table update unit 33 writes the source node of the Hello packet in "adjacent node" of the record created in step S33.

In step S36, the routing table update unit 33 performs a hidden-terminal process. The hidden-terminal process, which will be described in detail hereinafter, includes a process of determining a hidden-terminal weight. In step S37, the routing table update unit 33 writes "evaluation value" stored in the Hello packet in "route weight" of the record created in step S33.

Steps S38-S40 are substantially the same as steps S28-S30. That is, the routing table update unit 33 writes in the routing table 21 information generated using the work table 24.

In steps S41-S42, the routing table update unit 33 decides whether or not all information related to each destination node stored in the received Hello packet has been processed. When an unprocessed destination node remains, the routing table update unit 33 obtains information of a next destination node from the Hello packet and the process returns to step S32. Upon the finishing of the processes of steps S32-S40 for all of the destination nodes stored in the Hello packet, in step S43, the routing table update unit 33 calculates evaluation values and stores the calculation results in the routing table 21.

Figure 18:
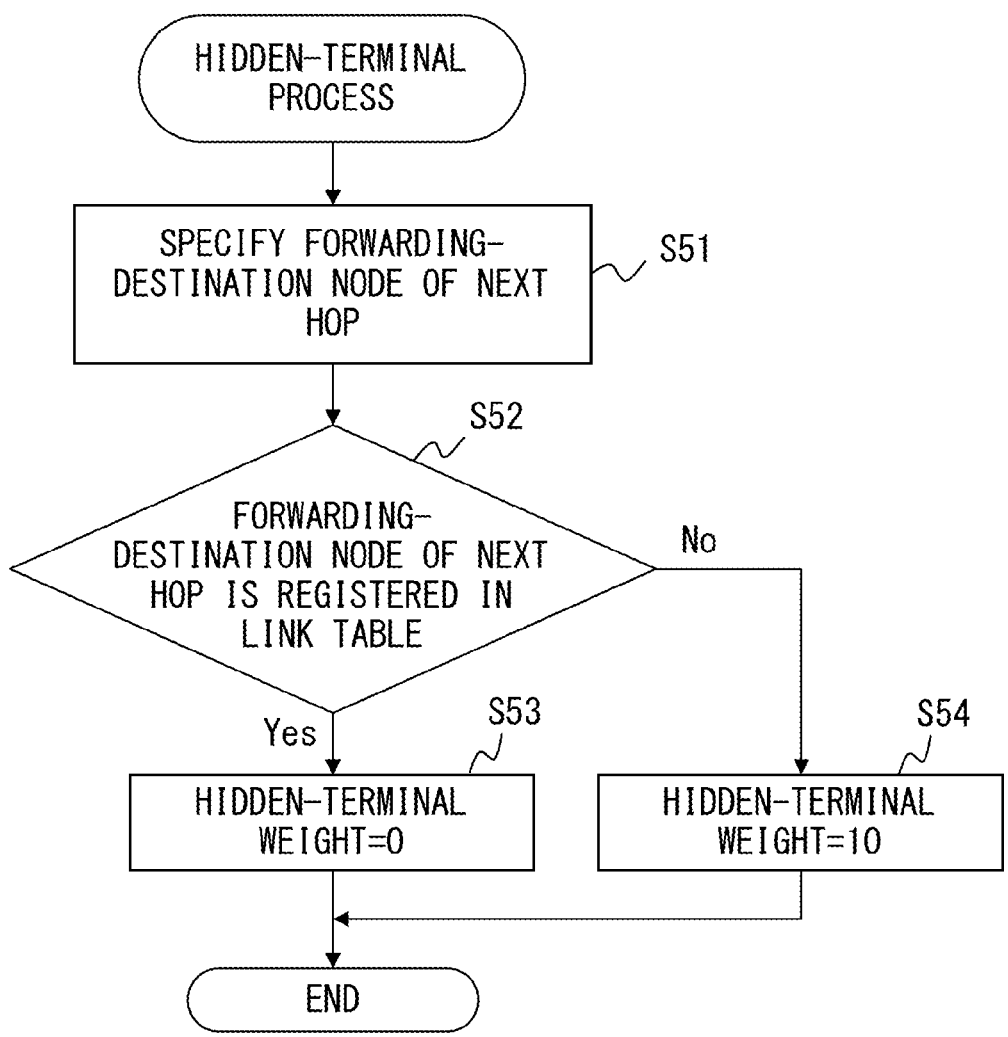
FIG. 18 is a flowchart illustrating an example of a hidden-terminal process.

FIG. 18 is a flowchart illustrating an example of a hidden-terminal process. The hidden-terminal process corresponds to step S36 in FIG. 17 and is performed by the routing table update unit 33.

In step S51, the routing table update unit 33 specifies a forwarding destination of a next hop on a route to a target destination node. "target destination node" means a destination node selected from destination nodes for which route information is stored in the Hello packet in the flowchart illustrated in FIG. 17. The next hop is, for example, a source node of the Hello packet. The forwarding-destination node that is a forwarding destination of the next hop is specified by, for example, "adjacent node" for the target destination node which is stored in the Hello packet.

In step S52, the routing table update unit 33 decides whether or not a forwarding-destination node that is a forwarding destination of the next hop is registered as "adjacent node" in the link table 22. When the forwarding-destination node that is a forwarding destination of the next hop is registered in the link table 22, the routing table update unit 33 sets in step S53 "hidden-terminal weight=0" in a corresponding record of the work table 24. Meanwhile, when a forwarding-destination node that is a forwarding destination of the next hop is not registered in the link table 22, the routing table update unit 33 sets in step S54 "hidden-terminal weight=10" in a corresponding record of the work table 24.

Note that in step S39 or S40 of FIG. 17, the contents of the work table 24 are written in the routing table 21. Thus, by performing step S39 or S40, "hidden-terminal weight" is set in the corresponding record of the routing table 21.

FIG. 19 is a flowchart illustrating a process of calculating an evaluation value for a destination node. This process corresponds to step S43 of FIG. 17 and is performed by the routing table update unit 33. For each of the records of the routing table 21, the routing table update unit 33 performs the process of the flowchart illustrated in FIG. 19. That is, the evaluation value is calculated for each route directing to each of the destinations.

Note that in the following description, For a record in which "destination node" that is not "adjacent node" in the routing table 21, "link weight" is omitted. The omission of link weights was described above with reference to FIG. 7.

In step S61, the routing table update unit 33 decides whether or not "link weight" is stored in a target record of the routing table 21. When "link weight" is stored in the target record, the routing table update unit 33 writes in step S62 "link weight" stored in the target record into "evaluation value" of this record.

When "link weight" is not stored in the target record, in step S63, the routing table update unit 33 searches for, from the routing table 21, a record having "adjacent node" of the target record as "destination node" and "adjacent node". In step S64, the routing table update unit 33 obtains "link weight" from the record specified in the search in step S63.

As an example, assume that the record having "destination node Z" in the routing table of the node X illustrated in FIG. 13D is a target record. In this case, "adjacent node" of the target record is the node G. Accordingly, in step S63, the record having "destination node G" and "adjacent node G" is extracted from this routing table. That is, the first record is extracted. As a result, in step S64, "link weight=9" is obtained.

In step S65, the routing table update unit 33 calculates the sum of "route weight" of the target record, "link weight" obtained in step S64, and "hidden-terminal weight" determined in steps S53-S54. The routing table update unit 33 stores the result of calculation in the routing table 21 as "evaluation value".

In steps S66-S67, the routing table update unit 33 decides whether or not an unprocessed record remains in the routing table 21. When an unprocessed record remains, the routing table update unit 33 performs steps S61-S65 for a next record.

Figure 20:
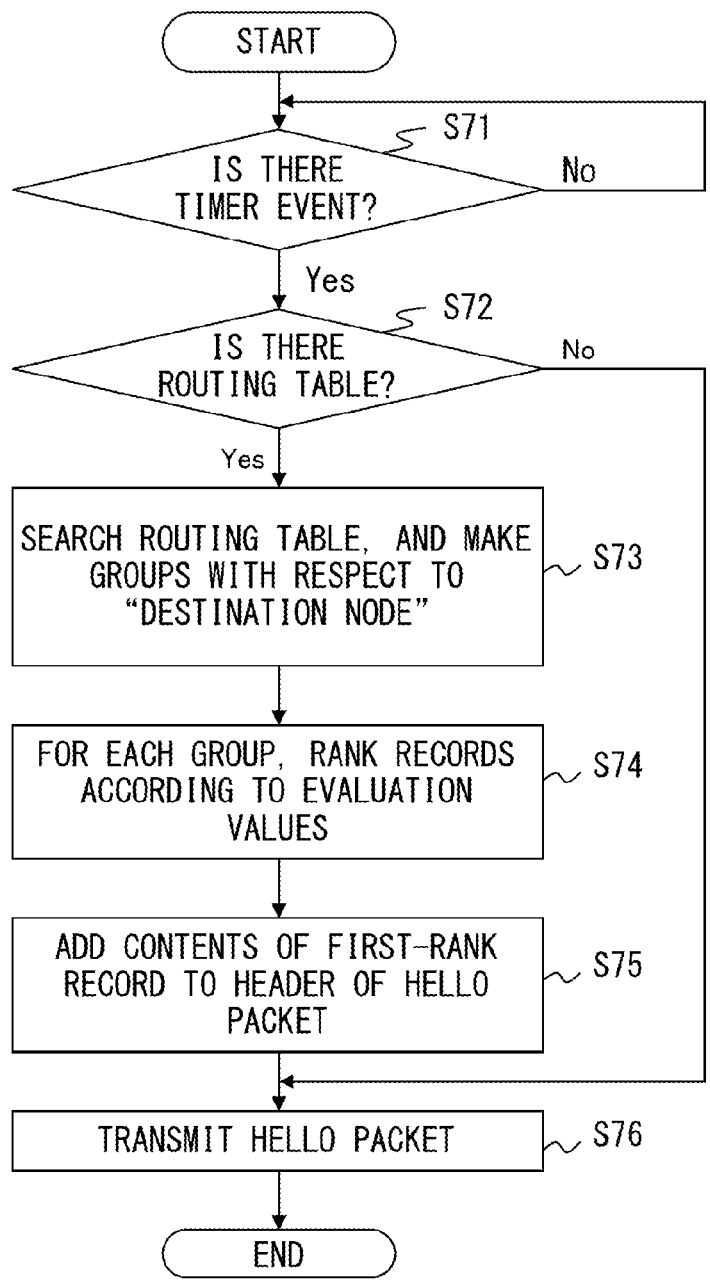
FIG. 20 is a flowchart illustrating a process of transmitting a Hello packet.

FIG. 20 is a flowchart illustrating a process of transmitting a Hello packet. Upon a timer generating a timer event signal, the process is performed by the route information transmitter 34. The timer generates timer event signals at specified time intervals.

In step S71, the route information transmitter 34 waits for the timer event signal. Upon receipt of the timer event signal, the route information transmitter 34 performs steps S72-S76.

In step S72, the route information transmitter 34 decides whether or not a routing table 21 has been created in the node that includes this route information transmitter 34. When a routing table 21 has not been created, the route information transmitter 34 skips steps S73-S75 and transmits a Hello packet in step S76. In this case, the route information transmitter 34 transmits an empty Hello packet (i.e., a Hello packet in which route information is not stored).

When a routing table 21 is present, in step S73, the route information transmitter 34 classifies records included in the routing table into groups in accordance with "destination node". In step S74, for each destination group, the route information transmitter 34 ranks records according to "evaluation value". For each destination group, "first rank", "second rank", and "third rank" are respectively given to a record with the smallest evaluation value, a record with the second smallest evaluation value, and a record with the third smallest evaluation value.

In step S75, for each destination group, the route information transmitter 34 extracts a first-rank record from the routing table 21. Then, the route information transmitter 34 generates a Hello packet that stores the contents of the record extracted from each destination group. That is, for each destination node, information related to a route with a smallest evaluation value (i.e., a route with a highest quality or a most efficient route) is stored in the Hello packet.

For example, the route information transmitter 34 respectively sets "destination node", "adjacent node", "hidden-terminal weight", and "evaluation value" of the routing table 21 as "destination node", "adjacent node", "hidden-terminal weight", and "evaluation value" of the Hello packet. However, "outgoing-link evaluation value" of the Hello packet is obtained from a corresponding record of the link table 22.

Subsequently, the route information transmitter 34 transmits in step S76 the Hello packet. Thus, route information stored in each node device is reported to its adjacent nodes. In addition, a node device that has received the route information from an adjacent node reports this route information to another adjacent node. In this way, route information is reported to node devices within the ad-hoc network.

As described above, in the route selection method in accordance with the embodiment, the node device reports the evaluation value of an optimum route to a destination node to its adjacent nodes. The evaluation value of the route includes not only a link weight that indicates the quality of a link but also a hidden-terminal weight that depends on the presence/absence of a hidden terminal. That is, information reported from a node device to its adjacent node includes an influence of a hidden terminal. Thus, in the route selection method, a node device does not necessarily need to report information directly indicating whether or not a hidden terminal is present to its adjacent node. As an example, the Hello packet illustrated in FIG. 8 does not necessarily need to store "hidden-terminal information".

The hidden-terminal weight in the descriptions above is "10", but such a weight is preferably determined according to, for example, a network configuration or an operation policy. As an example, when the communication efficiency of a network depends strongly on a link quality, a hidden-terminal weight is made smaller in comparison with a link weight. Alternatively, when the communication efficiency of a network depends strongly on a packet collision caused by a hidden terminal, a hidden-terminal weight may be made larger in comparison with a link weight.

Another Embodiment (1)

In the embodiments illustrated in FIGS. 6-20, the evaluation value of each route is expressed as the sum of a link weight (including a route weight) and a hidden-terminal weight. For each destination, a route with the smallest evaluation value is selected as an optimum route. However, each node device may select an optimum route according to another rule.

FIG. 21 illustrates a route selection method in accordance with another embodiment. Note that a routing table 21 provided in a certain node device is depicted in FIG. 21. The routing table 21 stores route information and quality information for a destination node GW.

In the example illustrated in FIG. 21, a route n1 (a route via an adjacent node n1), a route n2 (a route via an adjacent node n2), a route n3 (a route via an adjacent node n3), and a route n4 (a route via an adjacent node n4) are registered for the destination node GW. The evaluation value of each route indicates the sum of link weights of links to the destination node GW.

Hidden-terminal flags indicate whether or not a forwarding-destination node of a next-hop node is a hidden terminal. As an example, a first record (the route n1) indicates that, for a route to the destination node GW, a forwarding-destination node of a next-hop node (the adjacent node n1) is a hidden terminal. A second record (the route n2) indicates that, for a route to the destination node GW, a forwarding-destination node of a next-hop node (the adjacent node n2) is not a hidden terminal. The method for deciding whether or not a forwarding-destination node of a next-hop node is a hidden terminal is substantially the same as the method used in the embodiments illustrated in FIGS. 6-20.

The routing table update unit 33 ranks routes for a destination node using the following procedures.
(1) Extract routes for which hidden-terminal flag indicates OFF
(2) Give "rank" to routes extracted in (1) in ascending order of evaluation value
(3) Give "rank" to remaining routes in ascending order of evaluation value For the routing table 21 illustrated in FIG. 21, the routes n2 and n4 are extracted by procedure (1). Then, "route n2: first rank" and "route n4: second rank" are obtained by procedure (2). In addition, "route n1: third rank" and "route n3: fourth rank" are obtained by procedure (3).

As described above, also in the embodiment illustrated in FIG. 21, the priority of a route on which a hidden terminal is present is low. That is, a route on which a hidden terminal is present is not easily selected. When hidden terminals are present on all routes, the routing table update unit 33 performs procedure (3) only. In this case, the routing table update unit 33 selects a route according to evaluation values only.

The route information transmitter 34 transmits a Hello packet to an adjacent node. "hidden-terminal flag" of the routing table 21 is written in "hidden-terminal information" of the Hello packet. That is, the node device reports to the adjacent node whether or not a hidden terminal is present. Upon receipt of hidden-terminal information indicating whether or not a hidden terminal is present from an adjacent node, each node device references the hidden-terminal information so as to select an optimum route to the destination node. In particular, a node device decreases the priority of an adjacent node when this adjacent node has a hidden terminal.

Another Embodiment (2)

Figure 22:
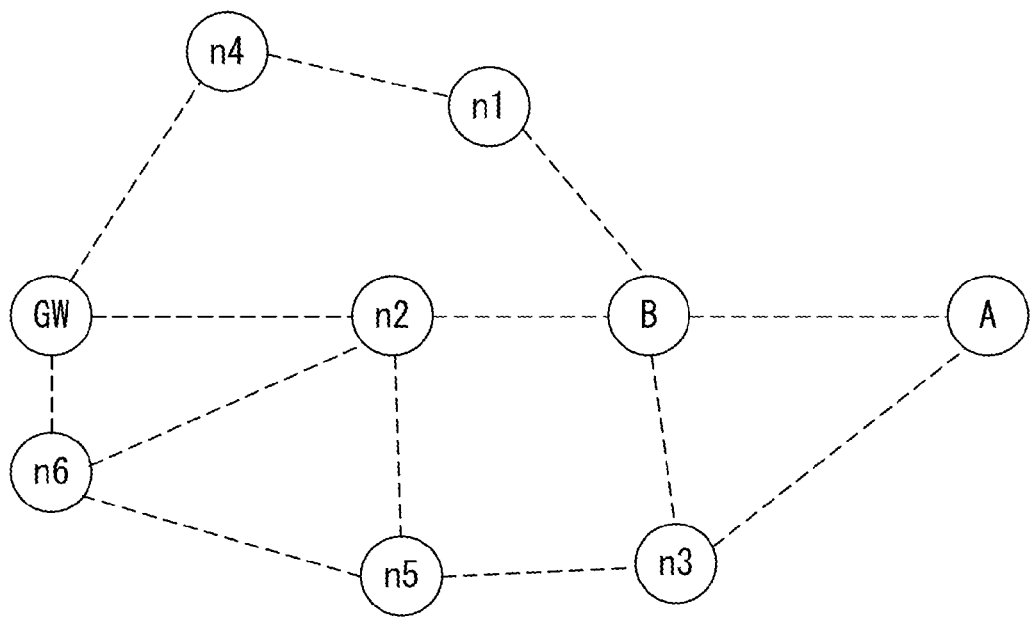
FIG. 22 illustrates a method for selecting a route in consideration of the number of hidden terminals.

FIG. 22 illustrates a method for selecting a route in consideration of the number of hidden terminals. In the example illustrated in FIG. 22, the following three routes are present as routes from a node A to a destination node GW. The following three routes are registered in a routing table 21 of a node B.
Route n1: route via nodes B, n1 and n4 to destination node GW
Route n2: route via nodes B and n2 to destination node GW
Route n3: route via nodes B, n3, n5 and n6 to destination node GW In FIG. 22, the node A can receives radio waves respectively transmitted from the nodes B and n3, but is incapable of receiving radio waves respectively transmitted from the nodes n1 and n2. That is, the nodes B and n3 are registered but the nodes n1 and n2 are not registered in the link table 22 of the node A.

In addition, the node B reports to the node A route information of the routes n1-n3 for the destination node GW. In the flowchart illustrated in FIG. 20, the route information transmitter 34 reports to an adjacent node route information of an optimum route for each destination node. By contrast, in the embodiment illustrated in FIG. 22, the route information transmitter 34 reports to an adjacent node the route information of all routes or a specified number of routes, wherein this route information is stored in the routing table 21 for each destination node.

Upon receipt of the route information of the routes n1-n3 from the node B, the node A detects the presence/absence of a hidden terminal for each route. In this example, the node A can receives radio waves from the node n3, but is incapable of receiving radio waves respectively from the nodes n1 and n2. Thus, the node A decides that the nodes n1 and n2 are hidden terminals. That is, the node A detects that two hidden terminals are present on the route via the node B.

The routing table update unit 33 of the node A determines a hidden-terminal weight in accordance with the number of hidden terminals. As an example, the hidden-terminal weight may be proportional to the number of hidden terminals. In this case, in the example illustrated in FIG. 22, the routing table update unit 33 of the node A sets "20" as the hidden-terminal weight of the route via the node B.

As described above, in the method for selecting a route in consideration of the number of hidden terminals, a packet is forwarded via a route with a smaller number of hidden terminals. Accordingly, the likelihood of a packet collision is decreased, and the communication efficiency is further improved.

Another Embodiment (3)

Anode device may consider a hidden terminal only when a specified node device is a destination. The specified node device is, for example, a gateway node. The gateway node may be connected to a server computer outside the ad-hoc network. And the gateway node may collect data from each node within the ad-hoc network and transmits the collected data to the server computer.

In this case, before performing step S36 in FIG. 17 (the hidden-terminal process), the routing table update unit 33 decides whether or not the destination node is a gateway node. When the destination node is a gateway node, the routing table update unit 33 performs the hidden-terminal process of step S36. Meanwhile, when the destination node is not a gateway node, the routing table update unit 33 skips step S36.

This method improves the efficiency of transmission of data addressed to a particular node. Accordingly, this method is preferable in a system in which a certain node device (e.g., a gateway node) collects data from each node in the network.

Another Embodiment (4)

In the embodiments illustrated in FIGS. 6-20, each node device reports the contents of its routing table to an adjacent node. By contrast, in the ad-hoc network in accordance with this embodiment, only the contents of the routing table of a particular node device (e.g., the gateway node described above) is reported to each node. That is, for example, the gateway node broadcasts route information addressed to this gateway node. By so doing, other node devices store the route information transmitted from the gateway node and addressed to the gateway, and forward the route information to adjacent nodes.

Such a network decreases traffic related to transmission of route information. Accordingly, the efficiency of data communication increases. In particular, in a system in which a gateway node collects data from each node in the network, such a scheme is useful since each node device only needs to have route information addressed to the gateway node.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wireless communication device used in a wireless network in which each wireless communication device forwards data by selecting a next hop adjacent node from among adjacent nodes based on an evaluation value, the wireless communication device comprising:
    a processor; and
    a transmitter, wherein
    each wireless communication device in the wireless network has a link table in which adjacent nodes of the relevant wireless communication device are registered,
    the processor obtains the link table from each of the adjacent nodes of the wireless communication device,
    the processor detects the number of hidden terminals for each of the adjacent nodes of the wireless communication device by counting the number of nodes that are registered in the link table obtained from the adjacent node but are not registered in the link table of the wireless communication device,
    the processor calculates, for each of the adjacent nodes of the wireless communication device, a sum of a link weight that represents communication cost of a link from the wireless communication device to a corresponding adjacent node, a route weight that represents communication cost of a route from the corresponding adjacent node to a destination, and a hidden terminal weight that represents the detected number of hidden terminals to generate the evaluation value with respect to a route to the destination,
    the processor selects an adjacent node with a smallest evaluation value from among the adjacent nodes of the wireless communication device as a next hop adjacent node, and
    the transmitter forwards data directed to the destination to the selected next hop adjacent node.

2. The wireless communication device according to claim 1, wherein
    the processor reports the evaluation value with respect to the route to the destination to an adjacent wireless communication device.

3. The wireless communication device according to claim 1, wherein
    the hidden terminal weight is in proportion to the detected number of the hidden terminals.

* * * * *